United States Patent
Ishizaka

(10) Patent No.: US 7,526,137 B2
(45) Date of Patent: Apr. 28, 2009

(54) IMAGE PROCESSING APPARATUS, IMAGE PROCESSING METHOD, IMAGE PROCESSING PROGRAM, AND STORAGE MEDIUM

(75) Inventor: Kanya Ishizaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 742 days.

(21) Appl. No.: 10/705,433

(22) Filed: Nov. 12, 2003

(65) Prior Publication Data

US 2004/0126033 A1 Jul. 1, 2004

(30) Foreign Application Priority Data

Nov. 13, 2002 (JP) ............................. 2002-330076

(51) Int. Cl.
G06K 9/40 (2006.01)
G09G 5/00 (2006.01)

(52) U.S. Cl. .................... 382/254; 382/269; 382/274; 345/611

(58) Field of Classification Search ................ 382/224, 382/254, 266, 275, 249
See application file for complete search history.

(56) References Cited

U.S. PATENT DOCUMENTS

| | | | | |
|---|---|---|---|---|
| 5,065,447 A | * | 11/1991 | Barnsley et al. | 382/249 |
| 5,347,600 A | * | 9/1994 | Barnsley et al. | 382/249 |
| 5,416,856 A | * | 5/1995 | Jacobs et al. | 382/249 |
| 5,701,369 A | * | 12/1997 | Moon et al. | 382/249 |
| 5,862,263 A | * | 1/1999 | Kim et al. | 382/249 |
| 6,002,794 A | * | 12/1999 | Bonneau et al. | 382/166 |
| 6,775,415 B1 | * | 8/2004 | Clausen et al. | 382/249 |
| 6,898,332 B2 | * | 5/2005 | Matsuhira | 382/284 |
| 2003/0095723 A1 | | 5/2003 | Ishizaka et al. | |
| 2003/0179953 A1 | | 9/2003 | Ishizaka | |

FOREIGN PATENT DOCUMENTS

| | | |
|---|---|---|
| JP | A 5-276382 | 10/1993 |
| JP | A 7-66977 | 3/1995 |
| JP | A 7-288693 | 10/1995 |
| JP | A 10-229546 | 8/1998 |
| JP | A 11-85961 | 3/1999 |
| JP | A 2000-20049 | 1/2000 |
| JP | A-2002-185770 | 6/2002 |

OTHER PUBLICATIONS

Arnaud E. Jacquin, "Fractal Image Coding: A Review", Proceedings of the IEEE, vol. 81, No. 10, Oct. 1993, pp. 1451-1465.*

* cited by examiner

Primary Examiner—Jingge Wu
Assistant Examiner—Jose M Torres
(74) Attorney, Agent, or Firm—Oliff & Berridge, PLC

(57) ABSTRACT

A domain block image is extracted from an original image by a domain block extracting section, and the domain block image is classified by a domain block classifying section. A range block extracting section extracts a range block image larger than the domain block image from the original image, and a reduced range block forming section reduces the range block image at the same size as the domain block image. A similarity degree judging section judges a similarity degree between the reduced range block image and the domain block image, and an improved domain block forming section performs a conversion of pixel values with respect to the reduced range block image in accordance with this similarity degree. Further, an edge enhancement processing section executes an edge enhancement processing as to the step edge portion so as to obtain an improved domain block image.

16 Claims, 11 Drawing Sheets

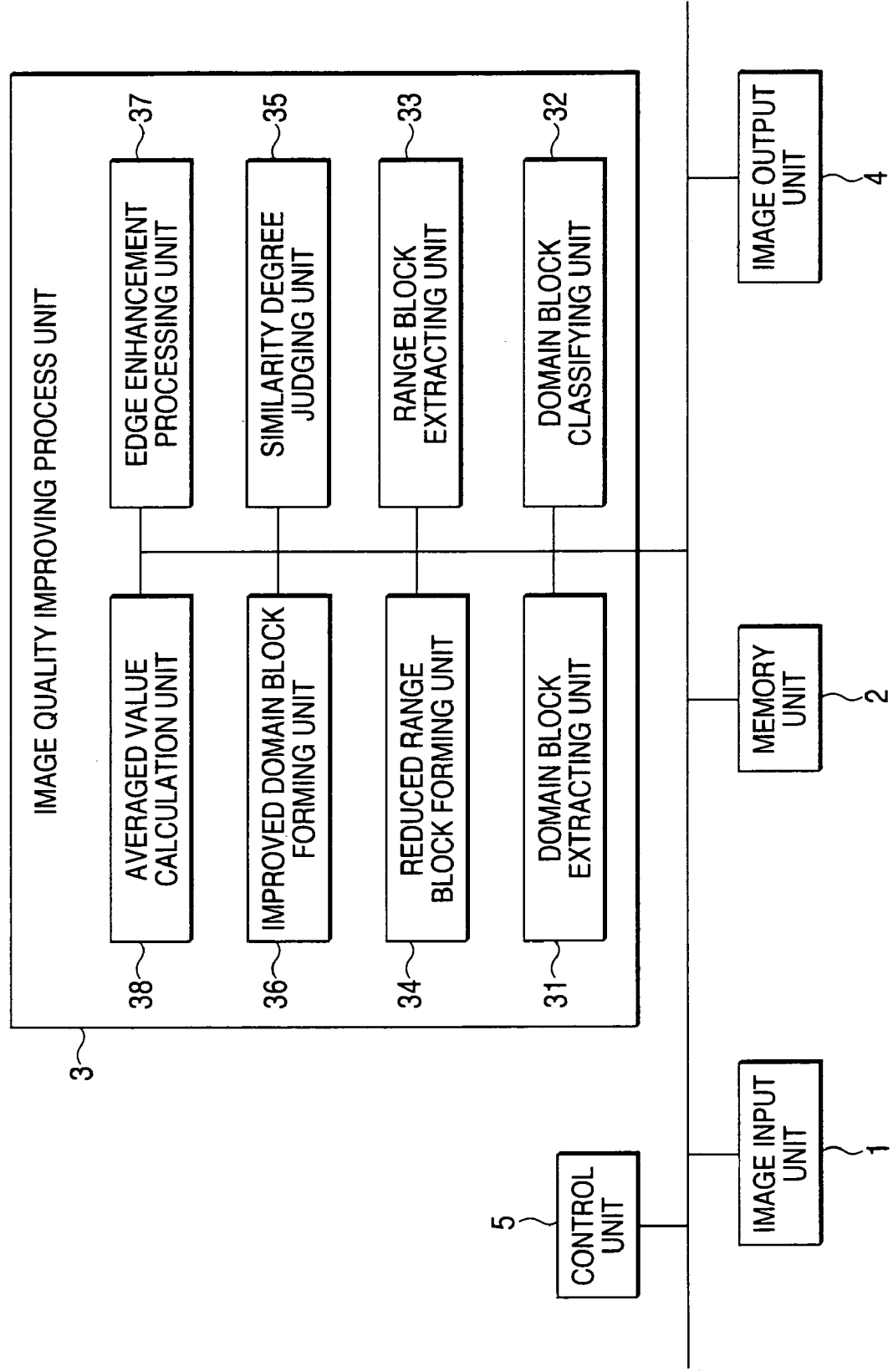

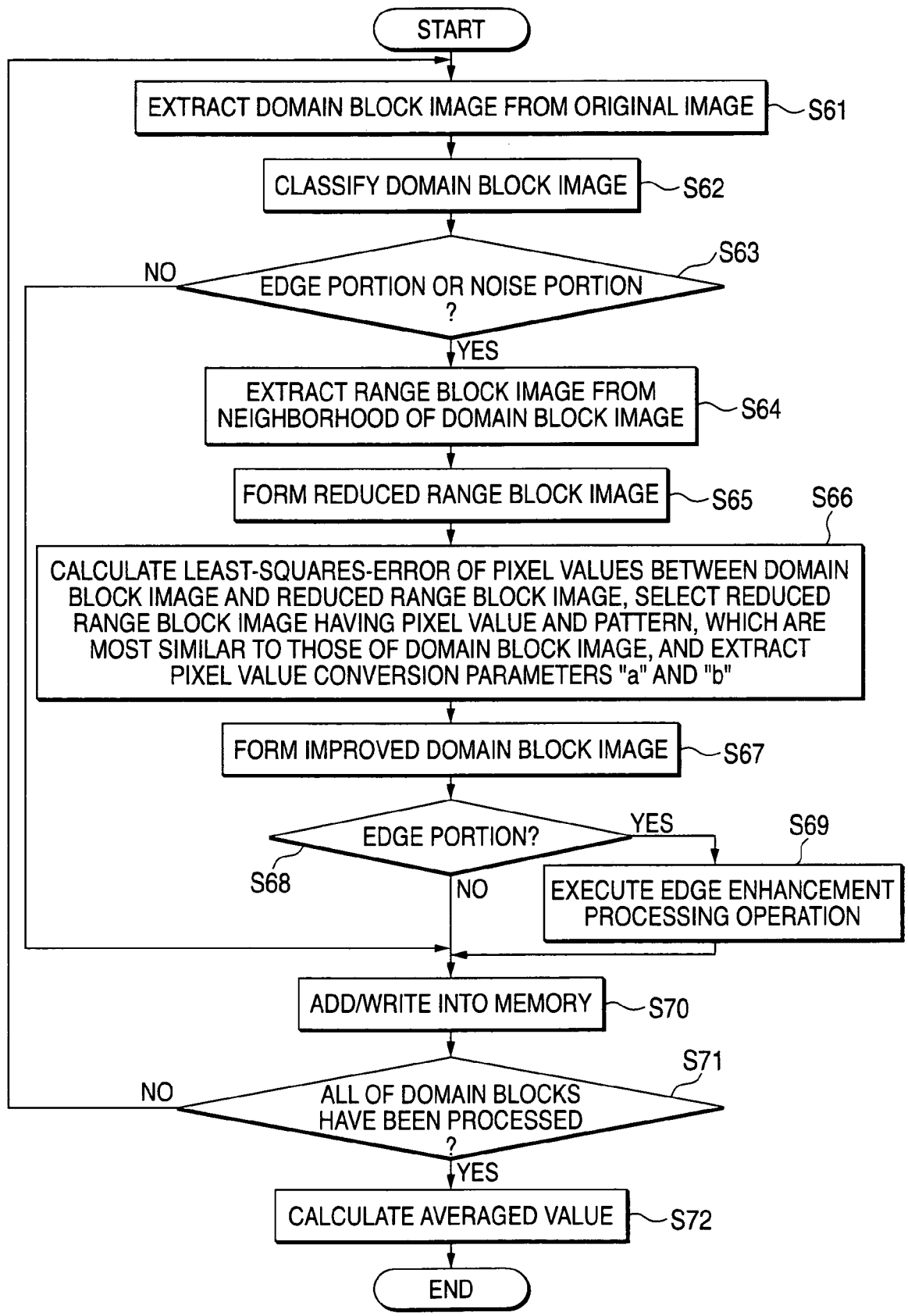

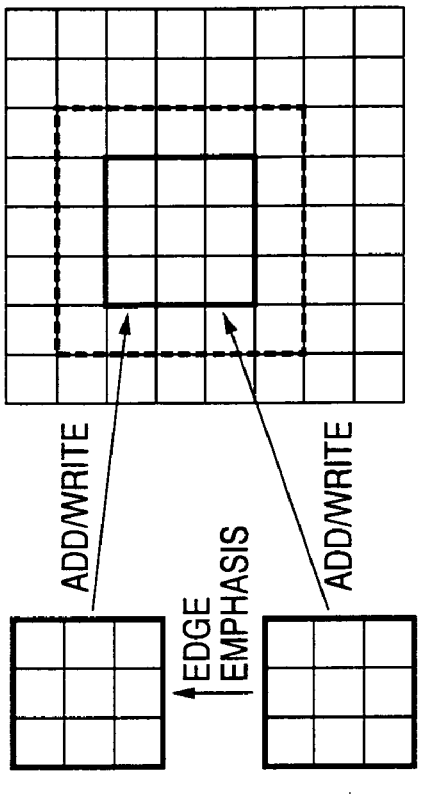
FIG. 3A
FIG. 3B
FIG. 3C
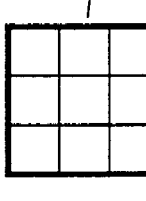
FIG. 3E
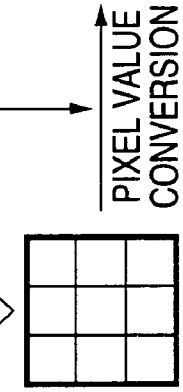
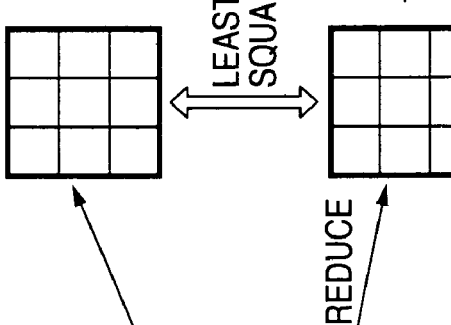
FIG. 3D
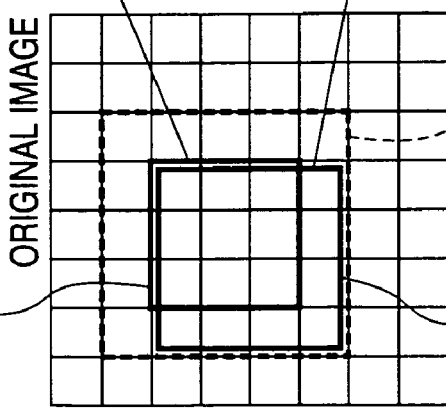
FIG. 3F

ORIGINAL IMAGE

ONE OF 3 x 3 DOMAIN BLOCK IMAGES

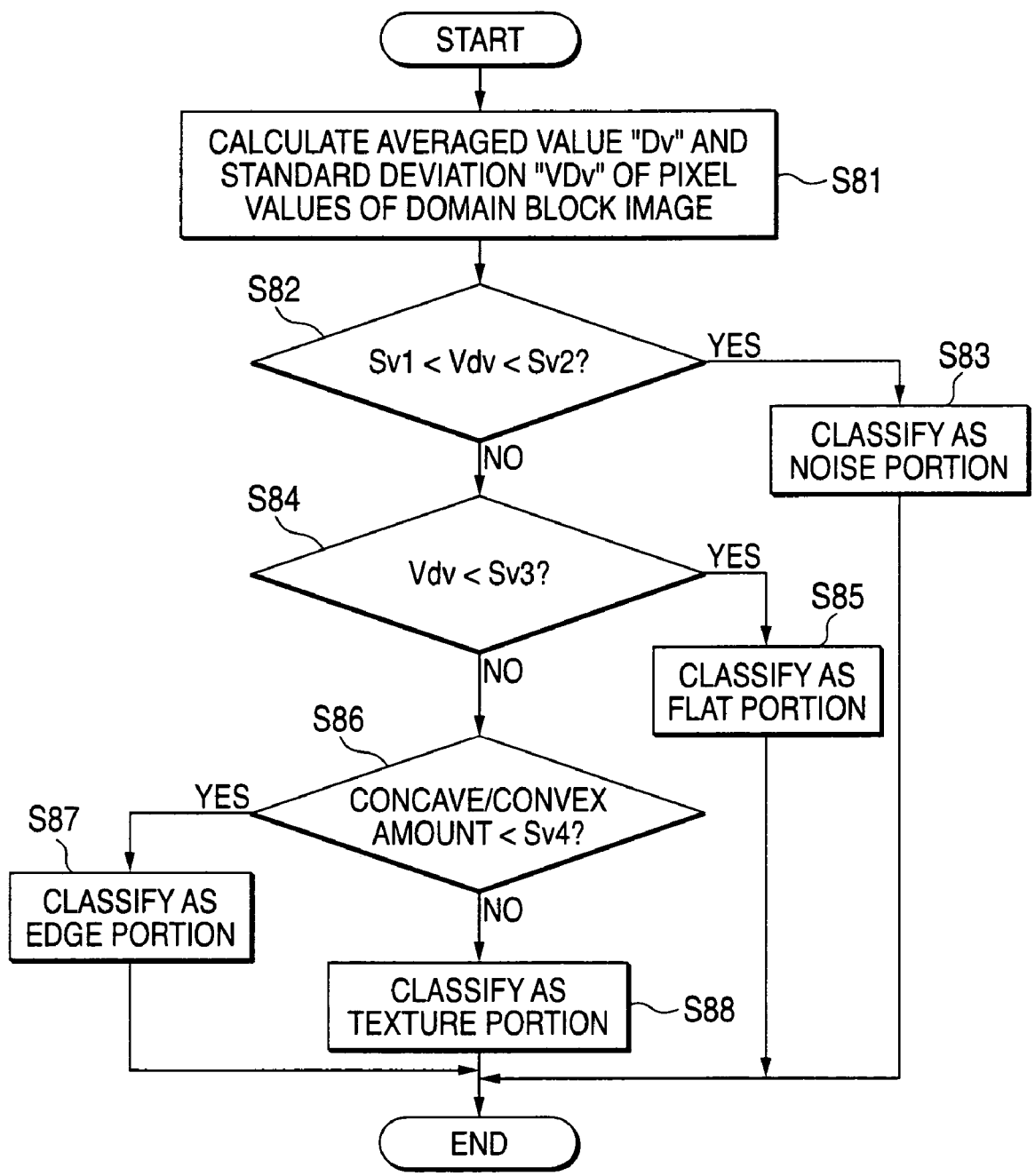

DOMAIN BLOCK IMAGE
ORIGINAL IMAGE
RANGE BLOCK IMAGE
EXTRACTING RANGE OF RANGE BLOCK IMAGE

FIG. 8B
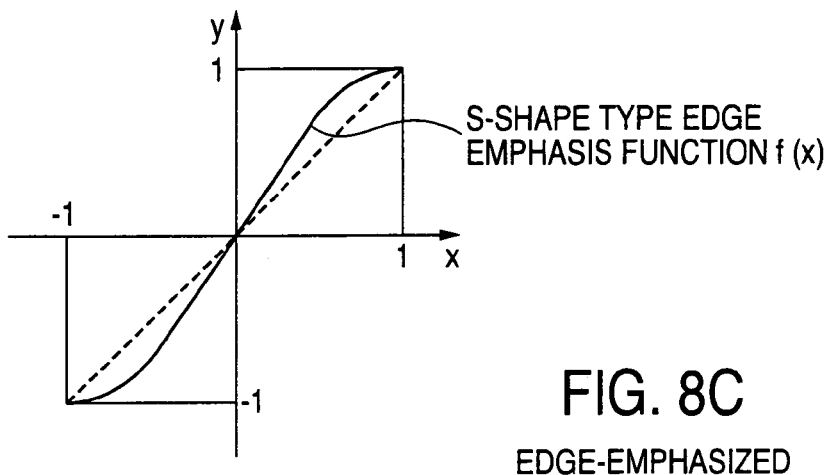
FIG. 8A
IMPROVED DOMAIN BLOCK IMAGE
| p11 | p21 | p31 |
| --- | --- | --- |
| p12 | p22 | p32 |
| p13 | p23 | p33 |
EDGE EMPHASIS PROCESSING →
FIG. 8C
EDGE-EMPHASIZED IMPROVED DOMAIN BLOCK IMAGE
| q11 | q21 | q31 |
| --- | --- | --- |
| q12 | q22 | q32 |
| q13 | q23 | q33 |
FIG. 9
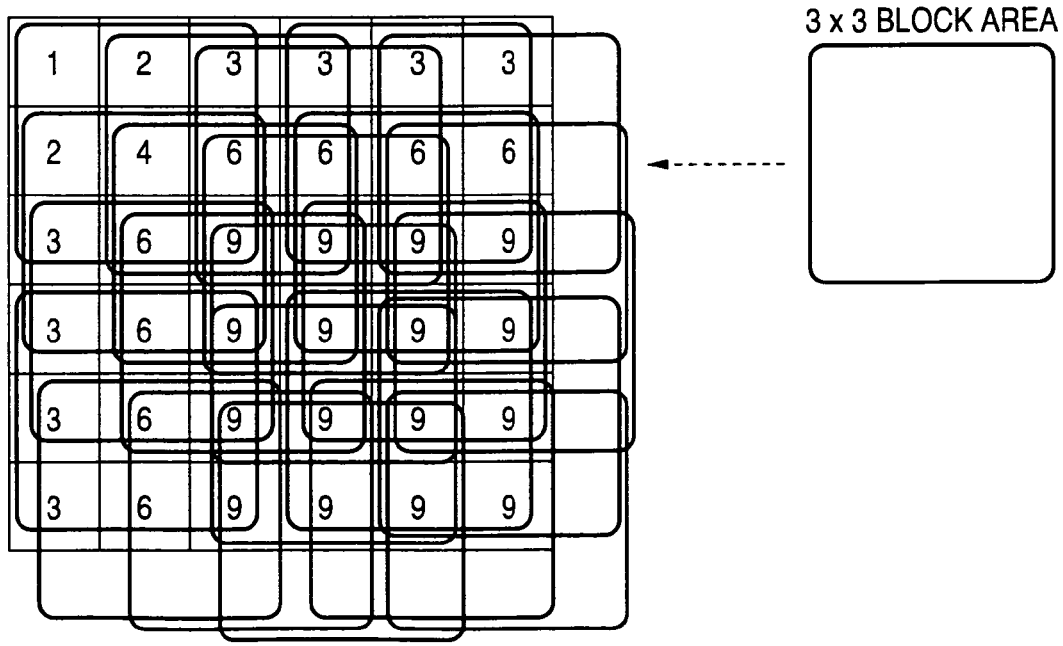

FIG. 11A
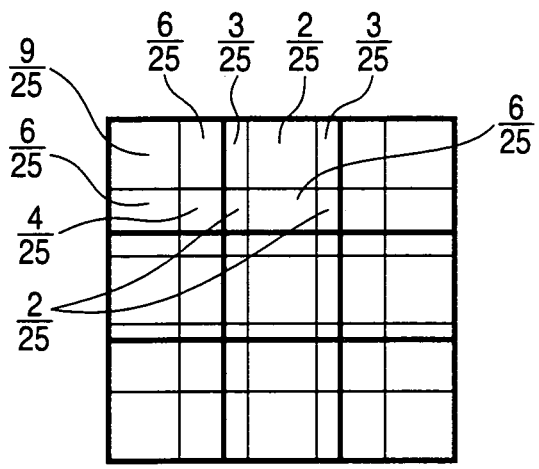
FIG. 11B
| P11 | P21 | P31 | P41 | P51 |
|-----|-----|-----|-----|-----|
| P12 | P22 | P32 | P42 | P52 |
| P13 | P23 | P33 | P43 | P53 |
| P14 | P24 | P34 | P44 | P54 |
| P15 | P25 | P35 | P45 | P55 |
↓ REDUCE BY PROJECTION METHOD
FIG. 11C
| Q11 | Q21 | Q31 |
|-----|-----|-----|
| Q12 | Q22 | Q32 |
| Q13 | Q23 | Q33 |
FIG. 12

IMAGE PROCESSING APPARATUS, IMAGE PROCESSING METHOD, IMAGE PROCESSING PROGRAM, AND STORAGE MEDIUM

BACKGROUND OF THE INVENTION

1. Field of the Invention

The present invention is related to a technique capable of improving image qualities when entered digital images are outputted to printers so as to be printed, or outputted to display apparatus so as to be displayed.

2. Description of the Related Art

Recently, since digital information is communicated which is originated from digital cameras, scanners, electronic documents, RTML documents, and the like, strong demands are made to display/print digital images (will be simply referred to "images" hereinafter) in high image qualities. While these images contain a large number of image quality deterioration components known as blurring components, jaggy components, and noise components, when such images are displayed and/or printed in high image qualities, various image quality improving processing are required. These image quality improving processing contain, for instance, corrections of blurring portions, antialiasing corrections (namely, corrections of jaggy portions), noise eliminations, and the like. For instance, there are some cases that blurring components, jaggy components, and noise components are contained in images of digital cameras, which are caused from optical limitations. Also, in such a case of JPEG-compressed images which are utilized many times, noise caused by image processing may be further produced. This noise is called as mosquito noise and/or block noise. As a result, processing for removing the above-explained noise is required. Also, in character recognizing fields and image diagnosing (medical image) fields, such processing capable of removing noise components and blurring components are required before recognizing is performed.

As techniques capable of improving image qualities, there are an edge enhancement processing, an antialiasing processing, a noise removing processing, and so on. A large number of technical ideas so as to these image quality improving processing have been conventionally disclosed. The below-mentioned technical ideas are recited as one example.

As the edge enhancement processing, for example, JP-A-7-66977 describes such an edge emphasizing method that while both a minimum value and a maximum value within a block are detected, a pixel value is limited within a range of these minimum/maximum values and is converted by employing a quadratic differential filter so as to execute the edge emphasizing. Also, JP-A-2000-200349 describes such a method for calculating a predicted ideal edge enhancement pixel value in such a manner that either a maximum value or a minimum value is selected from a plurality of images which have been thinned by different thinning intervals.

As the antialiasing processing (correction of jaggy portions), for example, JP-A-5-276382 describes such a method that a dot pattern within a predetermined range which contains an interesting dot of a binary image is compared with a predetermined pattern, and data of dots is changed based upon a comparison result so as to produce either a dropped dot or a projected dot. Also, JP-A-7-288693 describes such a method that a triangle projected from a jaggy portion is moved to a concave portion so as to smooth an edge, and then, this smoothed edge is filtered by a low-pass filter.

Furthermore, as the noise removing processing, for example, JP-A-10-229546 discloses such a noise removing method. That is, a block noise portion is selected based upon an averaged variation of pixel values and a variation of block boundary pixels with respect to pixels located around a boundary of compressed blocks when being coded. Then, a constant which is obtained based upon these variations is superimposed to the selected block noise portion, and the averaged variation is made coincident with the block boundary variation value so as to reduce block noise, and further to perform the edge enhancement processing. Also, as described in JP-A-11-085961, there is another noise reducing method. That is, with respect to such a pixel that existing probability of line-shaped shadows is high as to an X-ray medical image, a smoothing effect of a filter is suppressed to a lower smoothing effect, so that lowering of contrast is prevented. On the other hand, with respect to such a pixel that existing probability of line-shaped shadows is low and also probability corresponding to background noise is high, the a smoothing effect of the filter is increased so as to effectively reduce noise.

However, when the above-described conventional image quality improving processing is employed, the problems as to the image qualities can be individually solved. However, in such a case that image qualities are improved in a comprehensive manner, while the blurring portion, the jaggy portion, and the noise portion are separately recognized, the respective different methods are used at the same time, or in a sequential manner in order to highly improve these image qualities. As a result, there are some problems that the processing may become complex and also, the resulting image qualities are not made constant. Also, in such a case that the different methods are used in a combined manner, there is another problem that a stepped portion formed at a boundary portion where the processing are switched is changed in an unnatural condition, and thus becomes conspicuous. Furthermore, when the respective blurring/jaggy/noise portions are recognized, these portions are recognized in an erroneous manner and processed in erroneous methods, there is another problem. That is, the image qualities are further deteriorated, as compared with the deterioration portions of the original image.

As another aspect related to the image quality improving techniques, image enlarging techniques (namely, resolution converting techniques) are required in such a case that digital images produced from the above-described digital cameras, scanners, electronic documents, and HTML documents are enlarged to output the enlarged images, and in addition, when such media having different resolution is coupled to each other, e.g., in HDTV (high definition television) system, an NTSC television system, an electronic still camera, a medical image system, and a printing image system are coupled to each other. Images own various different resolution, and on the other hand, output apparatus such as printers for printing processing and display apparatus for display processing have resolution specific thereto. As a consequence, resolution conversions are necessarily required among mutual resolution. Concretely speaking, for instance, in order that an image having resolution of 75 dpi which is viewed on a display is outputted to a printer having resolution of 600 dpi, an enlarging factor of 8 times is required. Since these conventional enlarging process methods are employed, an enlarging processing can be performed in high image quality, while an original image is faithfully maintained.

However, when an image is enlarged, in such a case that this image contains the above-explained deterioration components (namely, blurring component, jaggy component, and noise component), even if an edge of this image may be smoothly enlarged by an enlarging algorithm, the following case happens to occur. That is, lowering of an image quality which is caused by directly enlarging these deterioration components may become conspicuous, while neglecting the edge smoothing effect. In such a case, the effect by the enlarging algorithm cannot be sufficiently accepted. Also, even when the conventional image quality improving processing are used as the pre-processing, and the image is enlarged after the deterioration components have been previously removed, if the matching characteristic cannot be established between this pre-processing and the image enlarging processing, then the effects cannot be sufficiently accepted.

When the above-described problems of the conventional techniques are summarized in the comprehensive manner, the blurring portion, the jaggy portion, and the noise portion cannot be processed by employing a single method in the conventional technique. To this end, for example, while the blurring portion, the jaggy portion, and the noise portion are separately recognized, it is so required that the different methods from each other are used so as to improve the image quality in high precision. Therefore, there are such problems that the processing become complex and the resulting image qualities are not made constant. Also, in such a case that the different methods are used in a combined manner, there is another problem that a stepped portion formed at a boundary portion where the processing are switched is changed in an unnatural condition, and thus becomes conspicuous. Furthermore, when when the respective blurring/jaggy/noise portions are recognized, these portions are recognized in an erroneous manner and are processed in erroneous methods, there is another problem. That is, the image qualities are further deteriorated, as compared with the deterioration portions of the original image. Also, since these image quality improving processing are not performed under such an initial condition that the image enlarging processing is thereafter performed, there is a further problem. That is, the image quality cannot be improved in order that the image can be improved in the higher image quality by the enlarging algorithm.

SUMMARY OF THE INVENTION

The present invention has been made to solve the above-described problems of the conventional techniques, and has an object to provide an image processing apparatus and an image processing method, an image processing program, and also, a storage medium for storing thereinto this image processing program. That is, deterioration components such as blurring, jaggy, and noise components of an image can be improved in a comprehensive manner in a high image quality by employing a single method. Furthermore, when an image is enlarged, these deterioration components are improved in order that this image can be enlarged with a high image quality.

To achieve the above-described object, an image processing apparatus and an image processing method, according to the present invention, are featured by that an original image represented by a large number of pixels is processed to acquire an improved image. That is, in the image processing apparatus, a domain block image is extracted from the original image in the unit "D" of a first block by a domain block extracting section; and a range block image is extracted from the original image in the unit of a second block unit "R" by a range block extracting section. Further, the extracted range block image is reduced to the size of the first block unit; a similarity degree between the domain block image and the reduced range block image is judged by a similarity degree judging section; and also, each pixel value with respect to the reduced range block image is converted based upon this judged similarity degree, so that an improved domain block image is formed by an improved domain block forming section. An image quality improved image can be obtained by employing the improved domain block image formed in this manner.

Besides, in the present specification, the term "block unit" is used to indicate a plurality of blocks characterized by the block size.

The above-described arrangement of the image processing apparatus is further provided with a domain block classifying section for classifying a domain block in response to both standard deviation and a concave/convex degree of pixel values of a domain block image; and the domain block image other than the domain block image which has been classified to a previously determined sort is directly outputted as the improved domain block image, so that the processing can be omitted. As the sorts to be classified, a flat portion, a step edge portion, a noise portion, and a texture portion may be employed. As the previously determined sorts, either the step edge portion or the noise portion, otherwise both the step edge portion and the noise portion may be employed.

The range block extracting section extracts the range block image in such a manner that the domain block image extracted by the domain block extracting section is contained in this range block image. Also, the image processing apparatus may be arranged by that a plurality of range block images are extracted with respect to one domain block image, the respective range block images are reduced, and then, a reduced range block image which is judged as the image having the highest similarity degree with respect to the domain block image among a plurality of the reduced range block images is selected so as to form the improved domain block image. At this time, when a pixel value "z" of the reduced range block image is least-squares-approximated to the pixel value of the domain block image by a linear transformation "az+b", the similarity degree judging section judges the reduced range block image having the smallest least squares error as a most resemblant reduced range block image having the highest similarity degree.

The improved domain block forming section forms the improved domain block image based upon a relationship for example, resemblant relationship between the domain block image and the reduced range block image which is obtained by reducing the extracted range block image by the first block unit, and also, a classification result of the main block image. For instance, the improved domain block forming section forms the improved domain block image in such a way that the pixel value of the most resemblant reduced range block image is converted by the linear transformation "az+b" with employment of least squares coefficients "a" and "b", which correspond to the most resemblant reduced range block image obtained by the similarity degree judging section.

Furthermore, in the above-described arrangement of the image processing apparatus, an edge emphasizing section may execute an edge enhancement processing with respect to the improved domain block image based upon both a relationship between a maximum value and a minimum value of the pixel values within the improved domain block images, and an edge degree of the improved domain block image. This edge enhancement processing may be performed in such a case that, for example, the domain block image is classified to the step edge portion. The edge enhancement processing may be performed by calculating an averaged pixel value as to both the maximum pixel value and the minimum pixel value within the improved domain block image, by converting a pixel value larger than the averaged pixel value into a larger pixel value in response to a distance between the own pixel value and the averaged pixel value, and also by converting a pixel value smaller than the averaged pixel value into a smaller pixel value in response to a distance between the own pixel value and the averaged pixel value in accordance with a strength of an edge enhancement. At this time, the strength of the edge enhancement is set in such a manner that when a standard deviation value of the pixel values contained in the domain block image is small, the strength is made strong, whereas when a standard deviation value of the pixel values is large, the strength is made weak.

Furthermore, the image processing apparatus may be arranged by that the domain block image is extracted in such a manner that the domain block image owns a cover portion on the original image, and an average value with respect to pixels where a plurality of the improved domain block images are overlapped with each other is calculated by an averaged value calculating section.

Also, the image processing apparatus may be arranged by that when the original image corresponds to a color image, the range block images are extracted from relatively same positions as to the respective color components of the original image.

Also, the present invention is to provide an image processing program for causing a computer to execute an image processing for executing the above-described image quality improving processing of the image. Moreover, the present invention is to provide a storage medium into which such an image processing program has been stored.

BRIEF DESCRIPTION OF THE DRAWINGS

These and other objects and advantages of this invention will become more fully apparent from the following detailed description taken with the accompanying drawings in which:

FIG. 1 is a block diagram for showing an example of a system containing an embodiment of the present invention;

FIG. 2 is a flow chart for explaining one example of processing of an image quality improving processing section 3 according to the embodiment of the present invention;

FIGS. 3A to 3F are schematic diagrams for representing one example of the processing of the image quality improving processing section 3 according to the embodiment of the present invention;

FIG. 5 is a flow chart for explaining an example of classifying processing of a domain block image in a domain block classifying section 32;

FIGS. 8A to 8C are explanatory diagrams for explaining an example of an edge enhancement processing in an edge enhancement processing section 37;

FIG. 9 is an explanatory diagram for explaining one example of an averaged value calculating processing in an averaged value calculating section 38;

FIGS. 11A to 11C are explanatory diagrams for explaining another example of the reducing processing by the projection method in the reduced range block forming section 34;

FIG. 12 is a process block diagram in a fifth example of the present invention.

DETAILED DESCRIPTION OF THE PREFERRED EMBODIMENTS

Figure 4:
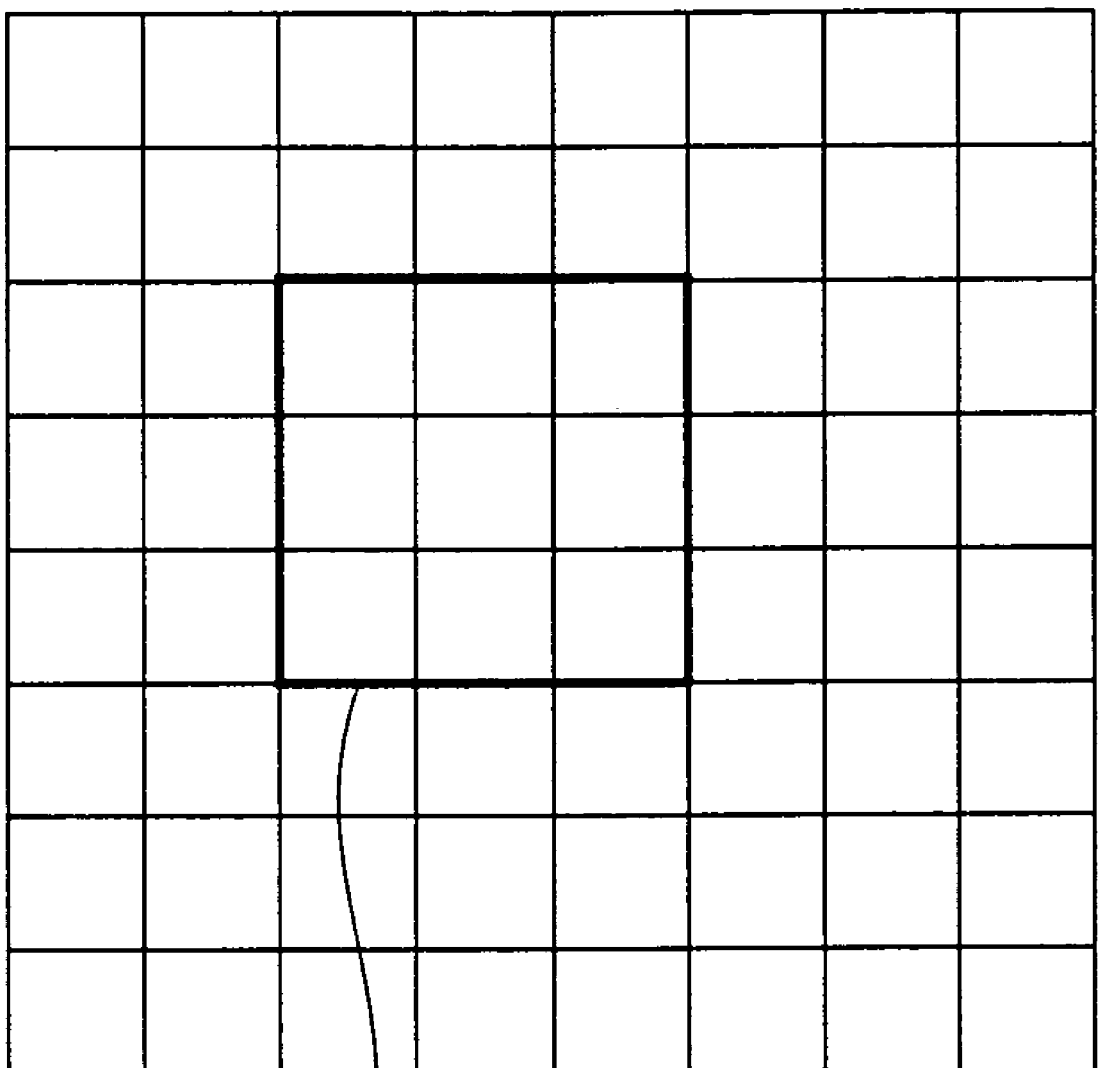
FIG. 4 is an explanatory diagram for explaining one example of a domain block image extracted by a domain block extracting section 31.
Figure 6A:
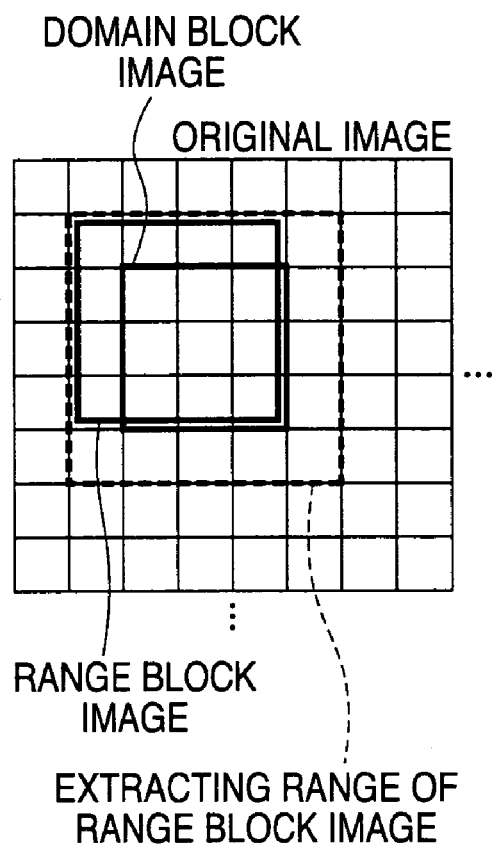
FIGS. 6A to 6D are explanatory diagrams for explaining an example of a range block image extracted by a range block extracting section 33.
Figure 6B:
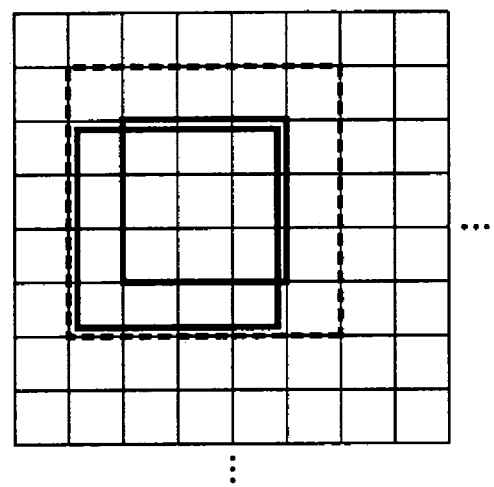
Figure 6C:
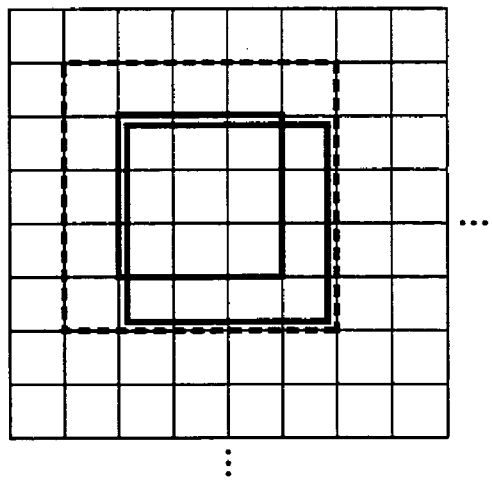
Figure 6D:
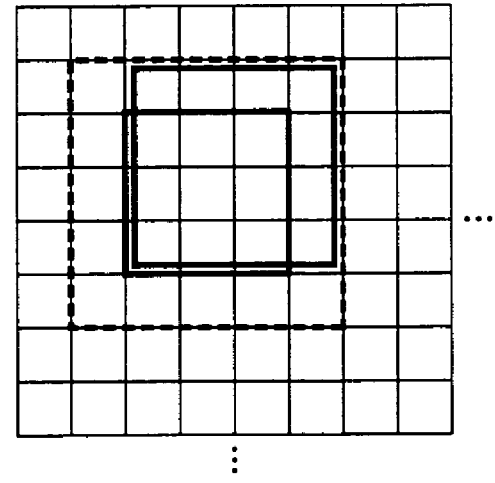

FIG. 1 is a block diagram for indicating an example of a system including an embodiment of the present invention In this drawing, reference numeral. 1 shows an image inputting section, reference numeral 2 represents a memory section, reference numeral 3 indicates an image improving processing section, reference numeral 4 denotes an image outputting section, and reference numeral 5 is a controlling section. Also, reference numeral 31 shows a domain block extracting section, reference numeral 32 represents a domain block classifying section, reference numeral 33 denotes a range block extracting section, reference numeral 34 represents a reduced range block forming section, and reference numeral 35 is a similarity degree judging section. Further, reference numeral 36 shows an improved domain block forming section, reference numeral 37 denotes an edge enhancement processing section, and reference numeral 38 indicates an averaged value calculating section.

The image inputting section 1 inputs thereinto digitized image data from an external section (not shown) of the system indicated in FIG. 1, and then transfers the digitized image data to the memory section 2. The memory section 2 holds thereinto image data entered from the image inputting section 1, image data whose image quality has been improved, and further, various sorts of halfway calculation results and process parameters, which are employed in image quality improving processing. The image-quality improving processing section 3 performs an image quality improving processing with respect to images which will be processed and are held in the memory section 2. The image outputting section 4 outputs image data whose image qualities have been improved by the image quality improving processing section 3, and the like to the external section of the system shown in FIG. 1. The controlling section 5 controls processing of the respective sections.

The image quality improving processing section 3 is constituted by containing the domain block extracting section 31, the domain block classifying section 32, the range block extracting section 33, the reduced range block forming section 34, the similarity degree judging section 35, the improved domain block forming section 36, the edge enhancement processing section 37, the averaged value calculating section 38, and the like. An improved domain block image which is outputted from the image quality improving processing section 3 is written into the memory section 2. At this time, as to the same pixel, a pixel value of a new improved domain block image is added with respect to a previously-written pixel value so as to update the pixel value. Next, an outline of the respective sections will now be summarized. It should be understood that detailed contents of these sections will be discussed later.

The domain block extracting section 31 extracts a domain block image in the unit of a first block from an original image. At this time, the original image maybe subdivided in order that the respective domain block images are not overlapped with each other. Alternatively, domain block images may be extracted in such a way that these domain block images own a commonly-used portion on the original image. Also, when an original image is a color image, range block images are extracted from relatively same positions as to the respective color components of the original color image.

The domain block classifying section 32 classifies sorts of domain block images which have been extracted by the domain block extracting section 31. The classification may be performed based upon, for example, standard deviation, a concave/convex degree, and the like of a domain block image. As to sorts to be classified, for example, sorts of domain block images may be classified into a flat portion, a step edge portion, a noise portion, a texture portion, and the like. It should be understood that a deterioration of an image quality such as a blurring phenomenon of an image and a jaggy phenomenon of an image mainly occurs in the step edge portion, and noise occurs in the noise portion. As a consequence, if the processing for improving the image quality is performed with respect to both the step edge portion and the noise portion, then the improvement in the entire image quality can be realized. As a result, while the below-mentioned processing is not performed as to such sorts other than the predetermined sorts (e.g., step edge portion and noise), for example, the flat portion and the texture portion, the system is controlled in such a manner that domain block images of an original image are directly outputted as improved domain block images, so that processing time can be shortened. Also, for example, if only the deterioration of the image quality such as the blurring phenomenon and the jaggy phenomenon of the image is improved, then the below-mentioned improvement of the image quality may be performed as to only the step edge portion. Also, for instance, if only the noise is improved, then the below-mentioned improvement of the image quality may be performed as to only the noise portion. It should also be understood that if such a process control processing by classifying the domain block image is not performed, but also an edge enhancement processing (will be explained later) by the edge enhancement processing section 37 is not performed, then the image quality improving processing section 3 maybe arranged without employing this domain block classifying section 32.

The range block extracting section 33 extracts a range block image from the original image in the unit of a second block which is larger than the first block unit as to the domain block image extracted by the domain block classifying section 32. In such a case that a portion of sorts of domain block images are transferred from the domain block classifying section 32, for example, either the step edge portion or the noise portion, or both the step edge portion and the noise portion of domain block images are transferred from the domain block classifying section 32, a range block image is extracted as to only these domain block images. Also, the range block image to be extracted is extracted in such a manner that this range block image contains the domain block image. At this time, a plurality of range block image may be extracted with respect to a single domain block image.

The reduced range block forming section 34 reduces the range block image extracted by the range block extracting section 33 in the same block unit as the first block unit of the domain block image, and thus forms a reduced range block image. It should be noted that the reducing method may be arbitrarily determined. When the range block extracting section 33 extracts a plurality of range block images, the reduced range block forming section 34 reduces the respective range block images.

The similarity degree judging section 35 judges a similarity degree between a reduced range block image which is reduced by the reduced range block forming section 34 and a domain block image which is extracted by the domain block extracting section 31, and then, transfers information related to the judged similarity degree to the improved domain block forming section 36. The judgement of similarity degrees may be arbitrarily performed. For example, a least squares error when a pixel value "z" of a reduced range block image is least-squares-approximated to a pixel value of a domain block image by way of a linear transformation of "az+b" may be employed. The similarity degree judging section 35 may be arranged in such a manner that least squares coefficients "a" and "b" obtained at this time are transferred to the improved domain block forming section 36. It should be noted that when a plurality of range block images are extracted, such a reduced range block image having the highest similarity degree with respect to the domain block image is selected. When the above-described least squares error is employed, such a reduced range block image, the least squares error of which is minimum, may be selected as the most resemblant reduced range block image.

The improved domain block forming section 36 converts a pixel value based upon the information related to the similarity degree obtained in the similarity degree judging section 35 with respect to the reduced range block image formed in the reduced range block forming section 34, and then outputs a conversion result of the pixel value as an improved domain block image. For instance, in such a case that the least squares error is calculated by the similarity degree judgeing section 35, while the least squares coefficients "a" and "b" obtained at this time are employed, the pixel value of the reduced range block image (most resemblant reduced range block image) is converted by the linear transformation "az+b", so that the improved domain block image is formed.

The edge enhancement processing section 37 executes an edge enhancement processing with respect to such an improved domain block image corresponding to a domain block image which has been classified to the step edge portion in the domain block classifying section 32 based upon both a relationship between a maximum pixel value and a minimum pixel value within the improved domain block image, and an edge degree of the improved domain block image. Concretely speaking, the edge enhancement processing section 37 calculates an averaged value between the maximum pixel value and the minimum pixel value within the improved domain block image. In accordance with a strength of an edge enhancement, this edge enhancement processing section 37 can convert a pixel value larger than the averaged value into a larger pixel value in response to a distance between this large pixel value and the averaged value, and also, can convert a pixel value smaller than the averaged value into a smaller pixel value in response to a distance between this small pixel value and the averaged value. At this time, the strength of the edge enhancement may be set in such a manner that this strength is made strong in such a case that a value of standard deviation of pixel values contained in the domain block image is small, whereas this strength is made weak in such a case that a value of standard deviation of pixel values contained in the domain block image is large.

In such a case that when the domain block extracting section 31 extracts domain block images, these domain block images are extracted under such a condition that these domain block images are overlapped with each other on the original image, the averaged value calculating section 38 calculates an average value as to pixels where improved domain block images are overlapped with each other. This calculating as to the averaged value may be performed as follows. That is, a subtraction is performed by overlapping number before the improved domain block image is written into the memory section 2, and thereafter, the subtraction result is added to a value which has been previously written into the memory 2. Alternatively, while the improved domain block images are sequentially added to the memory 2, the improved domain block images are written, and thereafter a subtraction may be performed.

Referring now to drawings, several examples as to the image quality improving processing section 3 corresponding to the major section of the present invention will now be described in detail. As a first example, a first explanation is made of a concrete processing capable of improving an image quality of a 256 gradation gray image. FIG. 2 is a flow chart for describing an example of processing of the image quality improving processing section 3 employed in the embodiment of the present invention. FIGS. 3A to 3F are schematic diagrams for schematically showing the processing of this image quality improving processing section 3. As an initial processing before this image quality improving processing is commenced, such a memory area is secured in the memory section 2, and is initialized by using "0." This memory area is used to store thereinto an image whose image quality has been improved and whose size is identical to a size of an original image which is to be processed as to the image quality improvement. This initializing is performed in order that improved domain block images (including domain block images to which edge enhancement processing has been performed) outputted from the image quality improving processing section 3 are added to each other, and then, the added improved domain block image is written into this memory area.

In a step S61, the domain block extracting section 31 extracts a domain block image from an original image. FIG. 4 is an explanatory diagram for explaining an example of the domain block image extracted by the domain block extracting section 31. In this explanatory diagram, while the size of the first block unit is defined by 3×3 pixels, such a domain block image having a size of 3×3 elements is extracted. It should be noted that also in FIG. 3A, a domain block image having a size of 3×3 pixels is indicated by a wide line. In this drawing, such a domain block image having a size of 3×3 pixels is extracted in sequential manner, which is positionally shifted from an edge of the original image every 1 pixel. Then, while the extracted domain block images are set as subject images to be processed, image qualities of these subject images are improved by executing the below-mentioned processing, and thus, improved domain block images are formed which are sequentially written into memory positions corresponding to domain block images within the memory section 2 so as to be added. In the below-mentioned description, processing as to one domain block image will now be explained.

In a step 562, the domain block classifying section 32 classifies a sort of the domain block image extracted in the step S61. FIG. 5 is a flow chart for explaining an example of the classifying processing of the domain block image executed in the domain block classifying section 32. First, in a step S81 of this flow chart, with respect to a pixel value of $\{d_{ij}|i,j=1,2,3\}$ contained in the domain block image, both a pixel averaged value "$D_v=\Sigma d_{ij}/9$" and pixel value standard deviation "$Vdv=\Sigma(d_{ij}-D_v)^2$" are calculated. In a step S82, the domain block classifying section 32 judges as to whether or not the pixel value standard deviation Vdv obtained in the step S81 can satisfy such a relationship "Sv1<Vdv<Sv2" with respect to predetermined threshold values "Sv1" and "Sv2" for judging a noise portion. When this pixel value standard deviation can satisfy this relationship, the domain block classifying section 32 classifies the domain block image as the noise portion To the contrary, when this pixel value standard deviation cannot satisfy this relationship, the domain block classifying section 32 further judges as to whether or not the pixel value standard deviation "Vdv" can satisfy another relationship "Vdv<Sv3" with respect to a predetermined threshold value "Sv3" for judging an edge portion. When the pixel value standard deviation can satisfy this relationship, the domain block classifying section 32 classifies the domain block image as the flat portion in a step S85.

When the pixel value standard deviation cannot also satisfy the condition of the step S84, the domain block classifying section 32 executes a texture judging calculation in a step S86 in order to classify the domain block image as the texture portion, or the edge portion. In this case, as the texture judging calculation, for example, the below-mentioned method may be employed. First, a 5×5 block is selected from the original image in such a manner that the domain block image is contained in a center position of this 5×5 block, and then, with respect to a 5×5 block pixel value $\{p_{ij}|i,j=1,2,3,4,5\}$, both a concave/convex degree "Wh" along a transverse direction, and a concave/convex degree "Wv" along a longitudinal direction are defined as:

$$Wh=\Sigma_{j=1}^{5}\Sigma_{i=1}^{3}\text{sign}((P_{ij}-P_{i+1j})\times(P_{i+1j}-P_{i+2j}))$$

$$Wv=\Sigma_{i=1}^{5}\Sigma_{j=1}^{3}\text{sign}((P_{ij}-P_{ij+1})\times(P_{ij+1}-P_{ij+2}))$$

In this definition, a function "sign" corresponds to such a function that when an entered value is smaller than 0, 1 is returned, whereas in any cases other than the above-described case, 0 is returned. Next, the domain block classifying section 32 judges as to whether or not the domain block image can satisfy such a condition "Wh+Wv<Sv4" with respect to a predetermined threshold value "Sv4" for judging a texture portion. If the domain block image can satisfy this condition, then the domain block classifying section 32 classifies the domain block as the edge portion in a step S87. To the contrary, if the domain block image cannot satisfy this condition, then the domain block classifying section 32 classifies the domain block as the texture portion in a step S88.

Both the concave/convex degree "Wh" in the transverse direction and the concave/convex degree "Wv" in the longitudinal direction imply that with respect to all of continuous 3 pixels within the 5×5 block, a judgment is sequentially made as to whether the relevant 3 pixels have the concave shapes, or the convex shapes, and then the judgment results are summed, namely imply that when the degree value of "Wh+Wv" is increased, concave/convex portions within the 5×5 block are increased.

As to the above-described judging threshold values "Sv1" to "Sv4", optimum threshold values may be selected to be fixed. Also, in such a case that a noise component is changed depending upon an image such as a JPEG image, for example, the judging threshold values Sv1 and Sv2 may be varied every image so as to be optimized. When a judging threshold value is variable, for instance, a Q factor which indicates a compressing image quality of a JPEG image is read out from a header portion of this JPEG image, and then, a threshold value may be acquired in response to this Q factor value. Also, when Sv3≦Vdv, a domain block image is classified into either an edge portion or a texture portion. When the judging threshold value "Sv3" is made slightly small, a blurred edge portion is not classified as a flat portion, but may be recognized as an edge portion. In other words, in this case, both an edge portion having an emphasized jaggy portion and an edge portion having an emphasized blurring portion are classified as the same "edge portions." It should also be noted that the method for classifying the texture portion and the edge portion is not limited only to the above-explained classifying method, but may be realized by employing other classifying methods. For example, instead of Wh+Wv, a maximum value "max {Wh, Wv}" among these concave/convex degrees "Wh" and "Wv" may be alternatively used. Otherwise, a concave/convex degree along an oblique direction may be newly conducted, and may be considered.

Returning back to FIG. 2, the image quality improving processing section 3 judges as to whether a classification result of a domain block image corresponds to the edge portion, or the noise portion in a step S63. As to a domain block image, the classification result of which corresponds to the edge portion or the noise portion, the image quality improving processing section 3 performs the below-mentioned image quality improving processing. Further, as to a domain block image, the classification result of which is judged as the edge portion, or any portion other than the noise portion (namely, either flat portion or texture portion), the image quality improving processing is not performed, but the processing is not performed, but the processing is advanced to a step S70. In this step S70, the image quality improving processing section 3 directly handles this domain block image as an improved domain block image, and then, writes this improved domain block image into the memory region of the memory section 2 used to store thereinto the image-quality-improved domain block image so as to add this improved domain block image to the previously-stored domain block image.

In a step S64, the range block extracting section 33 extracts a range block image containing a domain block image from the original image. In this case, as one example, 4×4 pixels are defined as the second block unit. FIGS. 6A to 6D are explanatory diagrams for explaining an example of the range block image which is extracted by the range block extracting section 33. In such a case that a size of a range block image is defined as 4×4 pixels and a range made of 5×5 pixels is defined as an extraction range of the range block image, as such a range block image containing the domain block image having the size of 3×3 pixels, 4 sets of such range block images as shown in FIG. 6A to FIG. 6D may be extracted. It should be understood that FIG. 3A illustratively describes the example shown in FIG. 6B.

In a step S65, the reduced range block forming section 34 reduces each of all of the above-described range block images extracted in the step S64 in the same size as the size of the domain block image. As previously explained, since the size of the domain block image is defined as 3×3 pixels, the reduced range block forming section 34 reduces the range block image having the 4×4 pixels to such a reduced range block image having 3×3 pixels. As a reducing method, an arbitrary reducing method may be employed. In this case, a projection method may be employed as one example. When the projection method is employed, since adjoining pixel values are weighted-added to each other in response to an area ratio so as to reduce the range block image, an antialiasing processing (correction of jaggy phenomenon), and a noise removing processing, according to the present invention, can be especially performed in an effective manner.

Figures 7A, 7B, 7C:
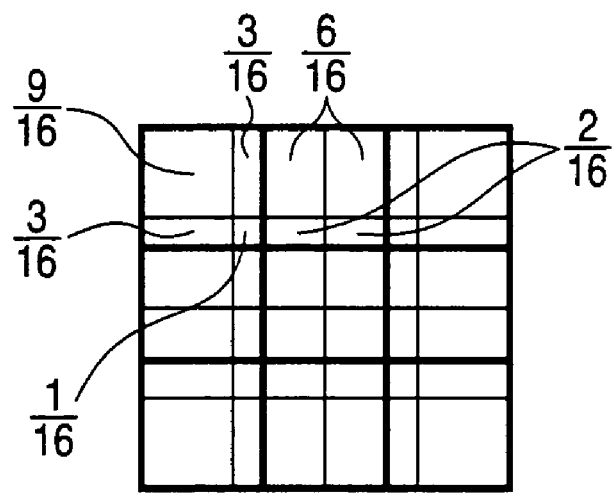
FIGS. 7A to 7C are explanatory diagrams for explaining an example of a reducing processing by a projection method in a reduced range block forming section 34.

FIGS. 7A to 7C are explanatory diagrams for explaining an example of a reducing processing by the projection method executed in the reduced range block forming section 34. In this case, the reducing processing by the projection method is performed as partially indicted in FIG. 7A. That is, pixel values are weighted-added to each other based upon an area ratio defined when the image having the 4×4 pixels is projected to the image having the 3×3 pixels. In such a case that pixel values of 4×4 sizes shown in FIG. 7B are defined as $\{P_{ij}|i, j=1, 2, 3, 4\}$, and pixel values of 3×3 sizes which have been reduced and is shown in FIG. 7C are defined as $\{Q_{ij}|i, j=1, 2, 3\}$, the respective pixel values "$Q_{ij}$" are given as follows:

$$Q_{11}=(9\times P_{11}+3\times P_{21}+3\times P_{12}+1\times P_{22})/16$$

$$Q_{21}=(6\times P_{21}+6\times P_{31}+2\times P_{22}+2\times P_{32})/16$$

$$Q_{31}=(3\times P_{31}+3\times P_{42}+9\times P_{41}+1\times P_{32})/16$$

$$Q_{12}=(6\times P_{12}+6\times P_{13}+2\times P_{22}+2\times P_{23})/16$$

$$Q_{22}=(4\times P_{22}+4\times P_{32}+4\times P_{23}+4\times P_{33})/16$$

$$Q_{32}=(6\times P_{42}+6\times P_{43}+2\times P_{32}+2\times P_{33})/16$$

$$Q_{13}=(9\times P_{14}+3\times P_{13}+3\times P_{24}+1\times P_{23})/16$$

$$Q_{23}=(2\times P_{23}+2\times P_{33}+6\times P_{24}+6\times P_{34})/16$$

$$Q_{33}=(3\times P_{43}+3\times P_{34}+9\times P_{44}+1\times P_{33})/16$$

In general, it may be predicted that a domain block image is similar to a range block image which contains this domain block image. When such an assumption can be established, noise is removed by executing a reducing processing in such a manner that this noise is weighted-added to neighborhood pixels. Also, since a total number of pixels is reduced, a stepped portion of gradation may become conspicuous and an edge portion is emphasized, so that a blurring phenomenon may be reduced to some extent. Furthermore, a jaggy phenomenon appearing on an emphasized edge portion may be reduced to some extent by performing a weighted-adding calculation. However, this reduction may be realized under such an initial condition that the domain block image is similar to the range block image. To this end, such a range block image which is similar to the domain block image is selected in the next step.

Returning back to the flow chart of FIG. 2, in a step S66, the similarity degree judging section 35 judges a similarity degree between the domain block image and a reduced range block image which is formed from each of the range block images in the step S65. In this step S66, since the pixel value converting is performed with respect to the reduced range block image, the similarity degree judging section 35 selects such a reduced range block image having both a pixel value and a pattern, which are the most similar to those of the domain block image, and acquires the information related to the similarity degree obtained at this time. First, as to pixel values $\{r_{ijk}|i, j=1, 2, 3, k=1, ---, 4\}$ of all of the reduced range block images, the similarity degree judging section 35 calculates a pixel averaged value "$Rvk=\Sigma r_{ijk}/9$, and pixel standard deviation "$VRvk=\Sigma(r_{ijk}-Rvk)^2$." Next, the similarity degree judging section 35 calculates both conversion coefficients "$a_k$" and "$b_k$", and also, a conversion error $E_k=\Sigma(d_{ij}-a_k\times r_{ijk}-b_k)^2$ in such a case that the pixel values "z" of the reduced range block image are least-squares-approximated respectively by using the linear conversion transformation "az+b" to the corresponding pixel values of the domain block image. It should be understood that the conversion coefficients "$a_k$" and "$b_k$", and also, the conversion error "$E_k$" may be directly obtained by performing the below-mentioned calculation formulae. It should also be noted that as "Dv" and "Vdv", the values calculated in the domain block classifying section 32 may be used.

$$a_k=(\Sigma(r_{ijk}-Rv_k)\times(d_{ij}-Dv))/VRv_k$$

$$b_k = Dv - a_k \times Rv_k$$

$$E_k = VDv - a_k \times a_k \times VRv_k$$

In this case, a restriction is made in the value of conversion coefficient "$a_k$." Thus, the below-mentioned condition formula is employed:

$$-10 \leq a_k \leq 10$$

With respect to the respective conversion coefficients "$a_k$ (k=1, - - - , 4)", a check is made as to whether or not the conversion coefficient "$a_k$" is contained in the above-described allowable range, and only the conversion coefficients "$a_k$" which are involved in the allowable range are collected to be defined as a set "G." Next, assuming now that $E = \min\{E_k | k$ is an element of $G\}$ it is so set that $a = a_k$ and $b = b_k$ with respect to "k" where $E = E_k$. A reduced range block image which is indicated by this "k" is the most resemblant image as to the domain block image. It should be noted that since the conversion coefficient "$b_k$" is not actually required to determine the conversion error "$E_k$", such a "k" is calculated by which the conversion error "$E_k$" becomes minimum, and after the conversion coefficient "$a_k$" has been finally determined, the conversion coefficient "$b_k$" may be calculated.

In a step S67, the improved domain block forming section 36 performs the pixel value conversion "az+b" based upon the conversion coefficients "a" and "b" calculated in the similarity degree judging section 35 with respect to all of the pixels "z" of the reduced range block image having the 3×3 size which is selected by the similarity degree judging section 35. This calculation result is assumed as the improved domain block image of the domain block image having the 3×3 pixels as represented in FIG. 3D.

In such a processing, the resultant improved domain block image may be formed from the range block image. However, as previously explained, if the domain block image is similar to the range block image, then the reduced range block image corresponds to such an image from which noise is reduced, and if both a blurring phenomenon and a jaggy phenomenon are present in this reduced range block image, then such a reduced range block image in which the phenomena has been reduced to some extent may be obtained. Furthermore, the improved domain block image which is formed by the improved domain block forming section 36 corresponds to such an image which has been similar (least-squares-approximated) by way of the pixel value converting. As a result, it is possible to assert that the improved domain block image corresponds to such an image which has been obtained by improving the image quality as to the domain block image.

The above-described processing has been uniformly performed with respect to both the edge portion and the noise portion. In order to furthermore improve the image quality of the edge portion, the edge enhancement processing section 37 may execute the edge enhancement processing. In a step S68, a judgment is made as to whether or not a sort of the corresponding domain block image corresponds to the edge portion. When the sort of this domain block image corresponds to the edge portion, in a steps 69, the edge enhancement processing section 37 executes the edge enhancement processing with respect to the improved domain block image. In this step S69, the edge enhancement processing section 37 executes the edge enhancement processing in such a manner that as to an intermediate value "av" of the pixel values within the improved domain block image, such a pixel value larger than this intermediate value "av" is made larger, whereas such a pixel value smaller than this intermediate value "av" is made smaller.

FIGS. 8A to 8C are explanatory diagrams for explaining one example of the edge enhancement processing performed in the edge enhancement processing section 37. With respect to such an improved domain block image $p_{ij}$ (i, j=1, 2, 3) having 3×3 pixels as shown in FIG. 8A, both a pixel minimum value "minp" and a pixel maximum value "maxp" are assumed as:

$$\min p = \min \{p_{ij}\}$$

$$\max p = \max \{p_{ij}\}$$

Furthermore, the intermediate value "av" and "l" are assumed as:

$$av = (\max p + \min p)/2$$

$$l = (\max p - \min p)/2$$

At this time, an edge emphasized pixel value of $q_{ij}$ (i, j=1, 2, 3) shown in FIG. 8C is obtained by performing the below-mentioned formula:

$$q_{ij} = av + f((p_{ij} - av)/l) \times l$$

In this formula, as the edge enhancement function "f", as indicated in FIG. 8B, such a function having an "S" shape is employed, while an origin (0, 0) is set to a center of this "S" shape. For instance, the below-mentioned function may be employed:

$$f(x) = x(1-x^2) \times \alpha + x (\alpha = 0.0 \sim 3.0)$$

In this formula, a variable "a" indicates a parameter which defines a strength of an edge enhancement, and the value of this variable "α" is selected to be 0.0 to 3.0. It should be understood that when the variable is α>0.5, since the function is not increased in a monotone, this function owns such a drawback that an overshoot/undershoot phenomenon may readily occur. However, this function may increase the effect of the edge enhancement. When α=0.0, the edge enhancement cannot be essentially performed. The larger the variable value "α" is increased, the stronger the edge enhancement effect can be obtained. The variable value "α" may be set to a fixed value. Alternatively, this variable value "α" may be variably set under such a condition that this variable value is directly proportional to an inverse number of the pixel value standard deviation "Vdv" corresponding to the strength of the edge portion. When the variable value "α" is set to be variable, it may be adjusted that the stronger edge enhancement is effected to the blurring portion (namely, portion having small standard deviation), whereas the weaker edge enhancement is effected to the originally sharp portion (namely, portion having large standard deviation). Apparently, as this function "f(x)", other functions may be used. Parameters of the edge enhancement may be fixed to the respective functions. For instance, the edge enhancement processing section 37 may be alternatively arranged in such a manner that the execution of the edge enhancement may be selectively switched.

In a step S70, the improved domain block image to which the edge enhancement processing has been performed in the above-explained manner is added/written with respect to a memory region used for improving an image quality in the memory section 2 (see FIG. 3F). When the edge enhancement processing is not performed, the improved domain block image itself which has been formed in the improved domain block forming section 34 is added/written into the image quality improving memory region contained in the memory section 2. Also, in such a case that the classified sort corresponds to the texture portion, or the flat portion other than the edge portion and the noise portion, the domain block image itself extracted by the domain block extracting section 31 is added/written into the image quality improving memory region contained in the memory section 2. This adding/writing is performed as follows: That is, while a pixel value of an image writing memory region is read out from the memory section 2, this read pixel value is added to a pixel value of a resultant improved domain block image, or the like, and then, the added pixel value is newly written into the same memory position of the image writing memory region.

In a step S71, the image quality improving processing section 3 judges as to whether or not the image quality improving processing has been performed with respect to all of the domain block images which should be extracted by the domain block extracting section 31. In such a case that there is such a domain block image which has not yet been processed, the processing is returned to the previous step S61. Then, the processing is repeatedly performed.

When the processing is accomplished as to all of the domain block images, in a step S72, the averaged value calculating section 38 executes a processing for calculating an averaged value as to the domain block images which have been written into the image quality improving memory region contained in the memory section 2. FIG. 9 is an explanatory diagram for explaining one example of the averaged value calculating processing executed in the averaged value calculating section 38. When the above-described processing with respect to the domain block image is performed, a duplicate amount (adding time) of the domain block images in the original image takes such a value as shown in FIG. 9. As a result, in the averaged value calculating section 38, such an image which is obtained by dividing the value stored in the image quality improving memory region of the memory section 2 by this duplicate value (duplicate amount) is again written into the image quality improving memory region so as to update the pixel value. In this case, when the pixel value becomes smaller than, or equal to 0, this pixel value is replaced by 0. When the pixel value exceeds the maximum value (for example, 255), this pixel value is replaced by the maximum value (for instance, 255). With executions of the above-described processing, the image quality improving processing is accomplished.

It should also be noted that the averaging processing by this averaged value calculating section 38 may be sequentially performed with respect to all the pixels to which the duplicate calculations have been accomplished so as to output an averaged value. This averaging processing may save the storage capacity of the memory section 2. Alternatively, the system may be arranged in such a manner that before the adding/writing to the memory section 2 is performed, the pixel value is previously divided by the duplicate value by the averaged value calculating section 38 in accordance with the writing position, and thereafter, the resultant pixel value is added/written.

In the above-described processing, a local collage processing is performed with respect to both the noise portion and the edge portion so as to improve the image quality. In other words, a range block image having 4×4 pixels, which contains a domain block image having 3×3 pixels, is selected. Then, this 4×4-pixel size is reduced to 3×3-pixel size, and a luminance fitting is performed. Then, the resulting range block image is edge-emphasized, and thereafter, this edge-emphasized range block image is replaced by a domain block image. When the 4×4-pixel size is reduced to the 3×3-pixel size, as explained above, the noise portion is averaged, so that the noise may disappear. Also, the edge portion where the jaggy portion becomes conspicuous may be averaged, and may be slightly blurred so as to be antialiasing-processed. Thus, the portions where the blurring phenomenon becomes conspicuous may be averaged to become slightly sharp. In addition, since the edge enhancement processing is performed, the blurring portion maybe furthermore made sharp. These problems can be completely solved by employing such a single method as the local collage processing.

On the other hand, since the methods and the parameters are switched in the flat portion/noise portion/edge portion in the conventional image quality improving method, this conventional image quality improving method could not solve the problem as to the deterioration of the image quality when the stepped portion is formed in the boundary portion, or the erroneous recognition is made in the boundary portion. To the contrary, in accordance with the above-explained processing of the present invention, the domain block image is classified into the flat portion, the texture portion, the noise portion, and the edge portion, the image qualities with respect to the noise portion and the edge portion are improved by employing the local collage processing method. Assuming now that the local collage processing method is applied to the flat portion, there is substantially no change before/after the image quality thereof is improved. As a consequence, if only the texture portion is correctly classified and the processing is not performed, then the remaining portions may be properly processed by executing the completely same processing except for the edge enhancement processing.

Also, in the edge enhancement processing, if the strength of the parameter is weakened, then the edge portion is not substantially emphasized. As a result, the strength of the parameter may be determined from the standard deviation value of the block image before the block image is classified. In other words, the above-described processing according to the present invention can improve the image qualities by employing the same method with respect to the flat portion, the noise portion, and the edge portion, and thus, can obtain the higher constant image qualities, while the stepped portion of the boundary portion among these portions does not appear. Even when a more or less erroneous recognition happens to occur in the classifying processing of the domain block image, lowering of the image quality does not occur.

Furthermore, based upon such a nature of the present invention, a jaggy correction of an edge is performed, and at the same time, a noise component is removed in an edge-noise portion image (namely, such an image that noise is superimposed on edge portion, for example, highly-compressed JPEG image). As previously explained, in the conventional technique, such a processing step is required for the image, in which after the noise component thereof has been once eliminated, the edge emphasizing is carried. However, according to the present invention, the requirement of such a complex processing step can be eliminated by executing the above local collage processing.

In the above-described concrete example, the domain block image has been classified into the flat portion, the edge portion, the noise portion, and the texture portion. For example, when an image has no problem as to noise, this image may be alternatively classified into a flat portion, but not classified into a noise portion. Then, the local collage processing may be alternatively performed as to only an edge portion. As explained in this alternative case, the present invention may achieve the advantage even in such a case that the image quality improving effect is wanted to be partially obtained.

Furthermore, in the above-described embodiment, both the shape of the domain block image and the shape of the range block image are squares. Apparently, either the domain block image or the range block image may be a rectangle, or both these domain/range block images maybe rectangles. For example, while a size of a domain block image is selected to be 3×3 pixels, a size of a range block image may be selected to be 3×4 pixels. Alternatively, while a size of a domain block image is selected to be 2×3 pixels, a size of a range block image may be selected to be 4×4 pixels. A description will now be made of a second example as such an example that a size of a range block image is changed.

Next, a description is made of the second example. In the above-described first example, the size of the range block image has been selected to be 4×4 pixels. In this second example, such an example that a size of a range block image is selected to be 5×5 pixels will be explained. Also, in this second example, an original image is a gray 256-color image, and a size of a domain block image is selected to be 3×3 pixels. Furthermore, in this second example, a processing is explained by the following assumption. That is, while a searching processing of a range block image is not performed, a single set of a range block image is continuously selected from the same position with respect to the domain block image.

A different technical point of this second example from the above-described first example is given in processing executed in the range block extracting section 33, the reduced range block forming section 34, and also, the similarity degree judging section 35, namely, the processing defined from the step S64 to the step S66 among the processing shown in FIG. 2. Now, these different processing will be described in a more concrete manner.

Figure 10:
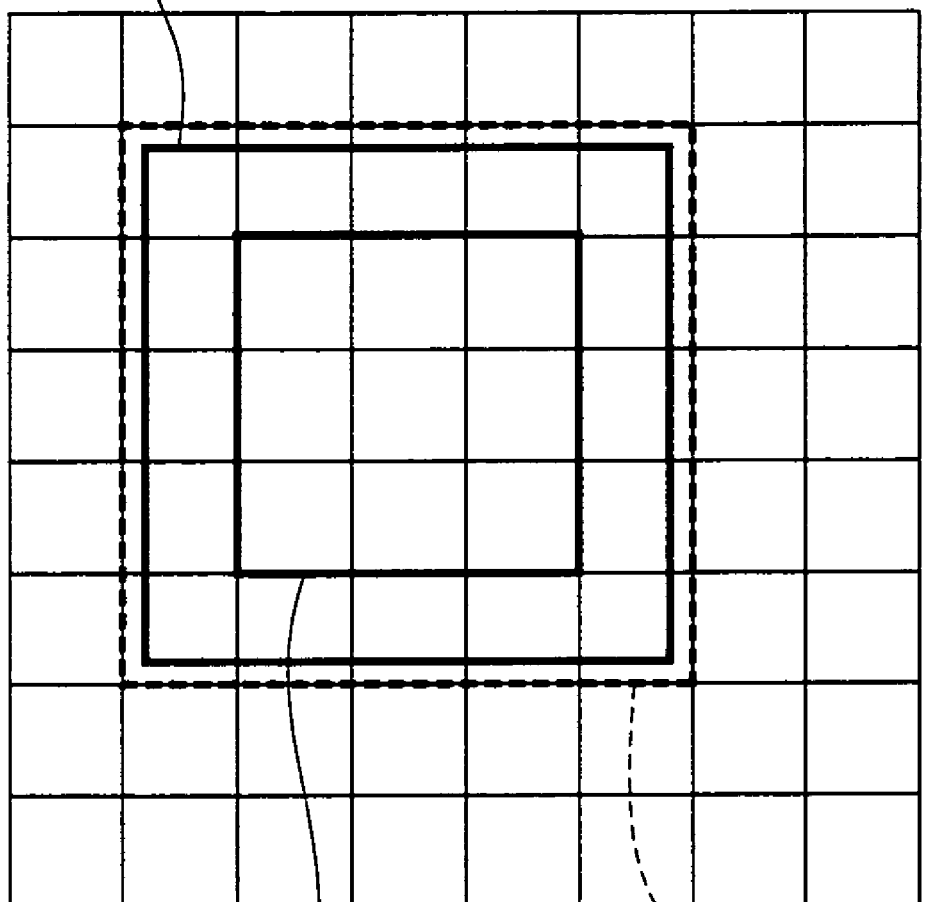
FIG. 10 is an explanatory diagram for explaining another example of the range block image extracted by a range block extracting section 33.

As a result of classifying a domain block image by the domain block classifying section 32, when this domain block image is classified into either a noise portion or an edge portion, the range block extracting section 33 extracts a range block image from an original image. FIG. 10 is an explanatory diagram for explaining another example of a range block image extracting processing executed in the range block forming section 34. In this second example, as represented in FIG. 10, 5×5 blocks are selected in such a manner that the domain block image is contained in a center position thereof. In this case, only one range block image is extracted. It is apparent that if an extracting range of range block images is widened, then a plurality of range block images may be retrieved. As explained above, as shown in FIG. 10, in this second example one range block image is extracted in a fixing manner. While range block images are extracted, such a range block image having 5×5 pixels which contains a domain block image having 3×3 pixels at a center position thereof cannot be extracted at an edge portion of this image. In such a case, for instance, a range block image may be selected from a position which is positionally shifted from 1 pixel.

It should be noted that when a domain block image is classified into both a flat portion and a texture portion, a range block image is not extracted, but this domain block image itself is selected as an improved domain block image. Then, the processing is advanced to, for example, the step S70 in FIG. 2, in which this improved domain block image is added/written into the memory section 2.

Next, the reduced range block forming section 34 reduces the extracted range block image having the size of 5×5 pixels so as to produce a reduced range block image having a size of 3×3 pixels. As to a reducing method of this second example, a projection method is employed. FIGS. 11A to 11C are explanatory diagrams for explaining another example of a reducing processing based upon the projection method in the reduced range block forming section 34. For instance, as partially shown in FIG. 11A, in accordance with the reducing processing by way of the projection method, pixel values are weighted-added based upon such an area ratio obtained when an image having a size of 5×5 pixels is projected to an image having a size of 3×3 pixels. Assuming now that as shown in FIG. 11B, the pixel values of the range block image having the size of 5×5 pixels correspond to $\{p_{ij}|i,j=1,2,3,4,5\}$, and also, as represented in FIG. 11C, the pixel values of the reduced range block image having the size of 3×3 pixels after the reducing processing correspond to $\{Q_{ij}|,i,j=1,2,3\}$, the respective pixel values "$Q_{ij}$" are given as follows:

$Q_{11}=(9\times P_{11}+6\times P_{21}+6\times P_{12}+4\times P_{22})/25$ $Q_{21}=(3\times P_{21}+3\times P_{41}+2\times P_{22}+2\times P_{42}+6\times P_{32}+9\times P_{31})/25$ $Q_{31}=(6\times P_{31}+6\times P_{42}+9\times P_{41}+4\times P_{32})/25$ $Q_{12}=(3\times P_{12}+3\times P_{14}+2\times P_{22}+2\times P_{23}+6\times P_{23}+9\times P_{13})/25$ $Q_{22}=(1\times P_{22}+1\times P_{42}+1\times P_{24}+1\times P_{44}+3\times P_{32}+3\times P_{23}+3\times P_{43}+3\times P_{34}+9\times P_{33})/25$ $Q_{32}=(3\times P_{52}+3\times P_{54}+2\times P_{42}+2\times P_{44}+6\times P_{43}+9\times P_{53})/25$ $Q_{13}=(9\times P_{15}+6\times P_{14}+6\times P_{25}+4\times P_{24})/25$ $Q_{23}=(3\times P_{25}+3\times P_{45}+2\times P_{24}+2\times P_{44}+6\times P_{34}+9\times P_{35})/25$ $Q_{33}=(6\times P_{54}+6\times P_{45}+9\times P_{55}+4\times P_{44})/25$ Next, the similarity degree judging section 35 executes a judging processing as to a similarity degree. Since only one range block image is selected in this second example, such a processing for selecting the most resemblant reduced range block image is not practically required. In other words, the reduced range block image itself which has been formed by the reduced range block forming section 34 may be selected as this most resemblant reduced range block image. First, as to pixel values $\{r_{ij}|i,j=1,2,3\}$ of all of the reduced range block images, both a pixel averaged value "$R_v=\Sigma r_{ij}/9$" and pixel standard deviation "$VR_v=\Sigma(r_{ij}-R_v)^{2n}$" are calculated respectively. Next, conversion coefficients "a" and "b" in such a case that each of the reduced range block pixel values is least-squares-approximated to the corresponding domain block image pixel value by way of a linear conversion transformation "az+b" are obtained from the below-mentioned formulae:

$a=(\Sigma(r_{ij}-Rv)\times(d_{ij}-Dv))/VRv$ $b=Dv-a\times Rv$

In this second example, since the processing for selecting the most resemblant reduced range block image is not required, the above-explained calculation as to the least squares error which has been executed in the first example is no longer required.

Since the subsequent processing of the improved domain block forming section 36, the edge enhancement processing section 37, and the averaged value calculating section 38 are similar to those of the first example, explanations thereof are omitted.

This second example indicates such an example that the size of the range block image which has been determined as the 4×4 pixels in the above-described first example is changed into the size of 5×5 pixels. When the pixel size is reduced from 5×5 pixels to 3×3 pixels, the higher noise removing effect, the higher antialiasing effect, and also, the higher sharpening effect can be achieved, as compared with such a case that the pixel size is reduced from the 4×4 pixels to the 3×3 pixels. As a consequence, in this second example, the higher improving effects as the noise portion and the edge portion can be achieved, so that the better processed image can be obtained, as compared with those of the first example. Also, the 5×5 blocks which contain the 3×3 blocks at the center position thereof are selected as the most resemblant reduced range block image without seeking the range block image. As a result, the processing speed can be increased, since the seeking processing is not executed. As previously explained, when the 5×5 blocks are selected, the similarity degree between the most resemblant reduced range block image and the domain block image is not always high especially in the texture portion. However, as explained above, since the processing are performed as to only the noise portion and the edge portion, which are classified by the domain block classifying section 32. Thus, the sufficiently high similarity degrees in these noise/edge portions can be obtained. Also, since blocks are overlapped with each other and the overlapped blocks are finally averaged, subtle concave/convex portions of an edge portion may be smoothed by being averaged.

Besides, parameters "a" and "b" of the pixel value transformation "az+b" can be fixed. In other words, in the second example, since the 5×5 blocks which contain the 3×3 blocks at the center position thereof are selected, and a difference between an averaged pixel value of the domain block image and that of the reduced range block image is often small, a calculation of the parameters "a" and "b" can be skipped. As a result, the processing speed can be increased. Alternatively, a way of using fixed parameters may be appropriately changed. For example, the fixed parameters are used for the noise portion based upon the classifying of the domain block image.

Next, a description is made of a third example. In the above-described first and second examples, the image quality improving processing related to the gray images have been described. In this third example, a description is made of such a case that the above-explained image quality improving processing is applied to a color image. When the above-explained image quality improving processing is applied to the color image, for example, is applied to RGB images, a gray sub-divided image having 256 gradation is formed as to an R (red) image, a G (green) image, and a B (blue) image. Then, an image quality of each of the R, G, B images is improved, and finally, the R, G, B images whose image qualities have been improved may be synthesized with each other. Alternatively, the image quality improving processing may be performed in the unit of a pixel in a parallel mode as to the respective R, G, B color components.

Also, when a range block image is searched in a similar manner to that of the first example, if different range lock positions from each other as to the R, G, B images are used, then there are some Possibilities that edge positions of R, G, B images are slightly shifted in an edge portion, or the like. Thus, there are some cases that-noise of R, G, B colors, or noise of an RGB-mixed color may occur. This problem may be mitigated by employing the same range block positions in the respective R, G, B sub-divided images of the domain block image. Therefore, for example, among the R, G, B signals, a searching processing of a range block image is performed with respect to such a signal (for example, G-signal) of a domain block image whose standard deviation value "Dv" is the largest value, whereas the searching processing is omitted with respect to the remaining two signals (for example, R signal and B signal). Then the range block image of the R signal and the range block image of the B signal, which are located at the relatively same positions as that selected in the G signal, may be extracted respectively. Thereafter, each of reduced range block images which have been extracted and reduced in the R, G, B signals is least-squares-approximated with the domain block image. Also, when the most resemblant reduced range block image is selected, reduced range block images at the relatively same positions in the R, G, B signals may be selected. Since such a processing is performed, substantially no noise which is caused by positional shifts of edge positions may occur.

It should also be noted that as to the respective R, G, B color components, different classifications may be performed in the domain block classifying section 32. In this case, different processing may be performed in response to the classification result. For example, where there is a blue-colored edge, a B-color component may be recognized as the edge portion, whereas both an R color component and a G color component are recognized as the flat portions. In this case, the local collage processing is performed with respect to a domain block image of the B color component, and no processing is performed with respect to domain block images of the R color component and the G color component, and then, a domain block itself may be selected as the improved domain block image.

As previously explained, the better image quality improving according to the present invention may be similarly performed as to the color image.

Next, a fourth example is described. This fourth example describes such an example that when a binary image is processed to obtain a multi-value image, this multi-value image is processed by an antialiasing processing so as to correct a jaggy portion. In this fourth example, it is so assumed that a similar processing to that of the above-explained second example is performed, and only different portions from these of the second example will be explained. A blurring element is not present in a binary image, and a noise portion cannot be separated from a texture portion. As a consequence, as sorts to be classified by the domain block classifying section 32, only a flat portion, an edge portion, and a texture portion are classified. Accordingly, only the edge portion is processed by the local collage processing in an actual case. Also, since the binary image corresponds to such an image whose edge becomes conspicuous, a jaggy portion of the edge portion becomes especially conspicuous. As a result, the edge enhancement processing is not performed as to this edge portion otherwise, an emphasis parameter may be selected to be 0.

As a preparation, a black dot of a given binary image is set to "0", and a white dot thereof is set to a maximum value (in this case, "255") when the binary image is converted into a multi-value image. Next, a local collage processing is performed, but an extracting processing of a domain block image by the domain block extracting section 31 is performed in a similar manner to that of the above-described second example.

A classifying processing of a domain block by the domain block extracting section 32 is basically similar to that of the above-described second example. However, as explained above, such a judgement as to whether or not a noise portion is present is not performed. For example, the processing defined in both the steps S82 and S83 in the classifying processing shown in FIG. 5 are not performed. That is to say, both a pixel averaged value "Dv=Σ$d_{ij}$/9" and pixel standard deviation Vdv=Σ$(d_{ij}-Dv)^2$" of a domain block image are calculated, while this domain block image is extracted. Next, when the pixel value standard deviation "Vdv" can satisfy such a condition of "Vdv<Sv3", the domain block image is classified to the flat portion. When the pixel value standard deviation "Vdv" cannot satisfy this condition, if such a condition of "Wn+Wv<Sv4" can be established with respect to the lateral direction concave/convex degree "Wh", the longitudinal direction concave/convex degree "Wv", and the texture judging threshold value "Sv4", then the domain block image is classified to the edge portion. To the contrary, if the above-described condition cannot be established, then the domain block image is classified to the texture portion.

Subsequently, any of an extracting processing of a range block image executed in the range block extracting section 33, a forming processing of a reduced range block image executed by the reduced range block forming section 34, a similarity degree judging executed in the similarity degree judging section 35, and also, an averaged value calculating processing executed by the averaged value calculating section 38 are similar to that of the above-described second example. As previously explained, either an edge enhancement processing by the edge enhancement processing section 37 is not performed, or an edge enhancement processing is performed while an edge enhancement parameter is set to "0." In any case, the edge enhancement processing is not essentially performed as to the domain block image.

As previously explained, in accordance with the fourth example, the binary image is once converted into the multi-value image, and then, the local collage processing is performed as to this multi-value image. As a result, the jaggy portion produced when the binary image is converted into the multi-value image can be properly corrected by the antialiasing processing. As apparent from the foregoing explanation, even in such a case that a total gradation number is increased, for example, a 16-color image, this color image may be processed in a similar manner to that of this fourth embodiment. Also, in such a case that a color image is mixed with a limited-color image, for example, such a method may be employed that a total color number within a 3×3 domain block image is counted with respect only to a block which has been classified to the edge portion, and thereafter, the smaller the total color number becomes, the weaker the edge enhancement parameter becomes. Further, in the case of a natural image (24-bit image, and 256-gray image), there are many cases that a total color number within a 3×3 domain block image of an edge portion becomes 5 colors, or more. However, in the case of a limited-color image with a color map, there are many cases that a total color number of a 3×3 domain block image of an edge portion becomes smaller than, or equal to 5 colors. As a consequence, the smaller the total color number becomes, the smaller the edge enhancement parameter is decreased, so that the edge enhancement strength is weakened, and the antialiasing effect is increased. On the other hand, when the total color number is larger than, or equal to 5 colors, this color image is regarded as the natural image, and thus may be processed in a similar manner to that of the third example. As previously explained, the edge enhancement parameter is judged by employing not only the standard deviation value, but also the total color number within the block, so that even when the color image is mixed with the limited-color image, the image can be processed without any problem.

It should be understood that in this fourth example, the edge enhancement processing is not performed. This is because the edge strength of the binary image is originally high. With respect to such a binary image, the edge portion thereof may be merely smoothed by the antialiasing effect achieved by the local collage method.

Next, a fifth example is explained. FIG. 12 is a block diagram for explaining a processing executed in the fifth example of the present invention. In this drawing, reference numeral 6 shows an enlarging processing section. In this fifth example, such an example is explained in which the image quality improving processing according to the present invention is combined with an enlarging technique, and the combined technical processing is utilized. As an original image, for example, a VGA image (namely, 640×480 pixels, JPEG-compressed image) photographed by a digital camera is used. When such a VGA image is printed on an A4-sized paper in a full-size mode, when output resolution is assumed as 300 dpi, an image enlargement factor by 4.96 times is required. As an arrangement capable of enlarging this image, the enlarging processing section 6 is provided.

The enlarging processing by the enlarging processing section 6, wherein: a judgment is made of a similarity degree between a domain block image and a reduced range block image which is produced by reducing such a range block image containing the first-mentioned domain block image, and either the range block image or the domain block image is enlarged; and a converting processing is performed with respect to this enlarged image in response to the judged similarity degree. As a result, an enlarged image having a high image quality can be obtained.

However, as explained above, this method corresponds to such a method for faithfully enlarging information of an image in a high image quality. As a result, when image quality deterioration components such as noise, jaggy portions, and blurring portions are present in an original image, which are caused by JPEG-compression, these deterioration components are also faithfully enlarged. Therefore, this enlarging method owns another problem in addition to the effect of the image quality improvements by the above-described enlarging method. That is, since the deterioration components are enlarged, the image quality is deteriorated, so that visibility of the deterioration components is increased.

Under such a circumstance, before an enlarging processing by the enlarging processing section 6 is performed, such a processing as explained in, for example, the second example and the third example of the present invention is performed in the image quality improving processing section 3, so that an image quality may be improved. As a result, the noise portions, the jaggy portions, and the blurring portions can be comprehensively improved. This reason will now be summarized. In the local collage processing executed in the present invention, the domain block image is replaced by the improved domain block image which is formed from the range block image having the wider area and containing this domain block image. As a result, the resemblant characteristic of the replaced area with respect to the neighborhood images is increased. In this case, when such a local self-similarity of an image is assumed, the image to which the processing of the present invention has been executed may become such an image capable of satisfying this local self-similarity. This local self-similarity of the image implies that "In an ideal image, a domain block image and a range block image similar to the domain block image are located very close to each other with the same direction. Also, a similarity degree thereof (conversion parameter "a" in least squares method) does not depend upon a scale (resolution)." The reason is given as follows: In accordance with the local collage processing of the present invention, the range block image which is similar to the domain block image and contains the domain block image is selected so as to form the improved domain block image. Also, when this improved domain block image is formed, the converting processing is performed by employing the similarity degree. Conversely speaking, in accordance with the present invention, the image is corrected in such a manner that the local self-similarity can be satisfied. Since the image is corrected in such a manner that the local self-similarity can be satisfied as explained above, the assumed "ideal image" can be obtained, and the visually better image can be acquired. Such a feature may also be realized in the above-explained first to fourth examples.

In addition, even when an "ideal image" is enlarged by the enlarging processing section 6, the image quality deterioration caused by the enlarging processing may be considerably lowered since the deterioration component is small. In other words, as previously explained, in the above methods, the enlarging processing is performed by utilizing a relationship with respect to the neighborhood images, namely the local self-similarity similar to the preset invention. As a consequence, since the image is corrected in such a manner that the local self-similarity can be satisfied, even when the enlarging processing is performed based upon the above-described method, the continuous characteristic with respect to the neighborhood images can be maintained, so that the enlarged image having the high image quality can be obtained.

It should also be noted that as explained in the above-described fourth example, the binary image can be eventually enlarged by the following processing. That is, the binary image is converted into the multi-value image and the local collage processing is performed forth is multi-value image. Thereafter, the enlarging processing is performed for this multi-value image by the enlarging processing section 6, while using the method. Thereafter, the resulting multi-value image is again converted into the binary image. Also, in this case, an enlarged binary image having a high image quality can be obtained.

Figure 13:
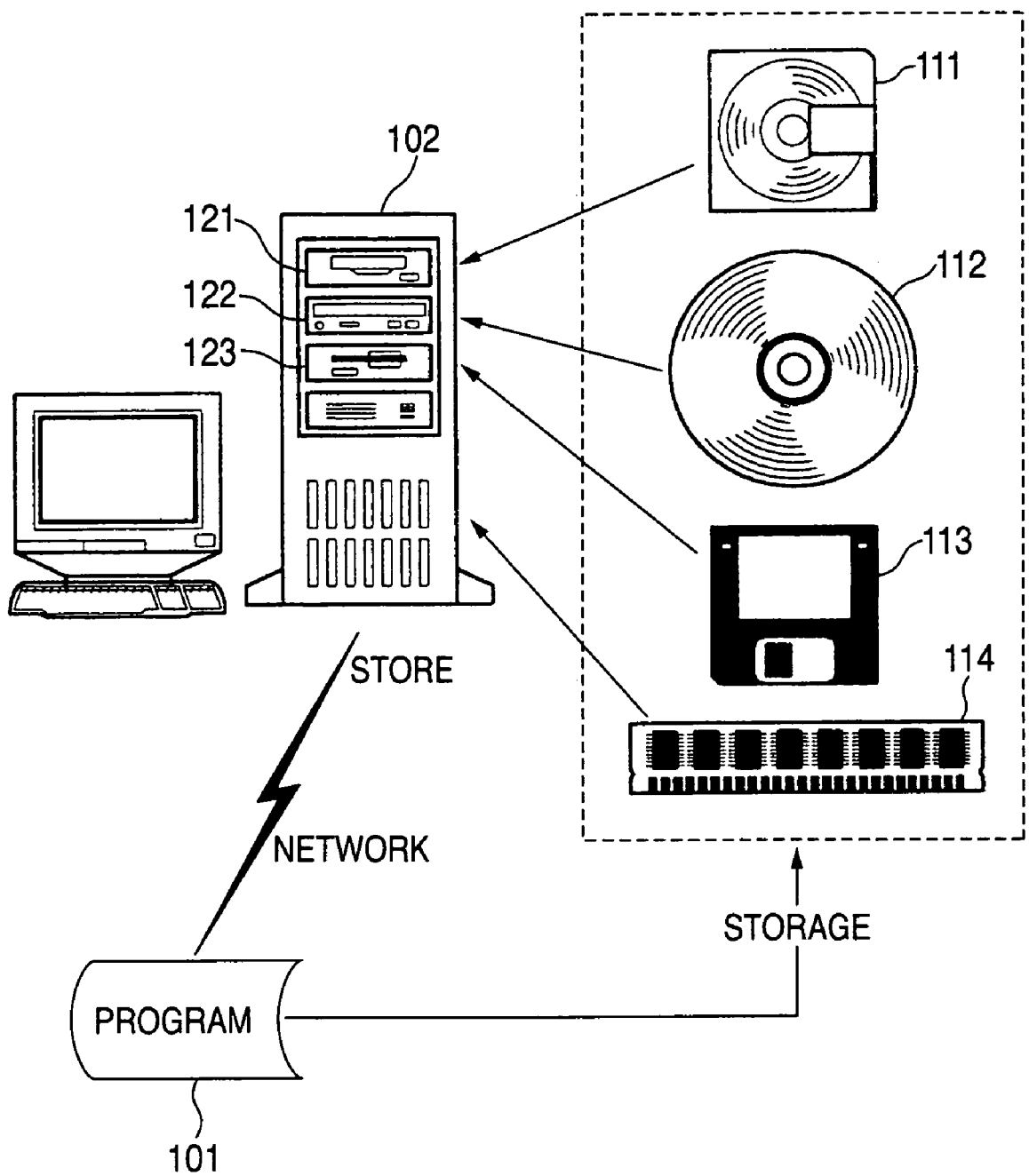
FIG. 13 is an explanatory diagram for explaining an example of both a computer program and a storage medium for storing thereinto this computer program in such a case that either the functions of the image processing apparatus or the image processing method according to the present invention are realized by the computer program.

FIG. 13 is an explanatory diagram for explaining an example of both a computer program and a storage medium for storing thereinto this computer program in such a case that either the functions of the image processing apparatus or the image processing method according to the present invention are realized by this computer program. In this drawing, reference numeral 101 shows the computer program, reference numeral 102 indicates a computer, reference numeral 111 represents a magneto-optical disk, reference numeral 112 denotes an optical disk, and reference numeral 113 is a magnetic disk. Also, reference numeral 114 shows a memory, reference numeral 121 represents a magneto optical disk apparatus, reference numeral 122 denotes an optical disk apparatus, and reference numeral 123 shows a magnetic disk apparatus.

The functions of the image quality improving processing section, which are explained in the embodiment of the present invention and are indicated as the first example to the fifth example, or the functions further including the enlarging processing section 6 indicated in the fifth example may also be realized by the computer executable program 101. In this case, this computer-executable program 101 and data which are employed by this program 101 may also be stored in a computer-readable storage medium. A storage medium implies such a medium that with respect to a reading apparatus equipped in a hardware resource of a computer, in response to a content described in a program, a change status of energy such as magnetic energy, optical energy, and electric energy is induced, and then, the content described in the program can be transferred to the reading apparatus in the format of a signal corresponding to the energy change status. For example, this storage medium corresponds to the magneto-optical disk 111, the optical disk 112, the magnetic disk 113, the memory 114 (containing IC card and memory card), and so on. Apparently, these storage media is not limited only to portable type storage media.

While the program 101 has been stored into any one of these storage media, this storage medium is mounted on the magneto-optical disk apparatus 121, the optical disk apparatus 122, the magnetic disk apparatus 123 of the computer 102, or a memory slot (not shown), so that the program 101 is read from the mounted storage medium by the computer 102, and then, either the functions of the image processing apparatus or the image processing method of the present invention can be executed by this computer 102. Alternatively, while the storage medium is previously loaded on the computer 102, the program 101 may be transferred to the computer 102 via, for example, a network or the like, and thus, this program 101 may be stored in the storage medium so as to be executed by the computer 102.

Apparently, a portion of the functions of the present invention may be alternatively constructed of hardware otherwise, all of these functions may be arranged by hardware.

As apparent from the above-described explanations, in accordance with the present invention, since a single set of such a local collage processing is performed, the noise reducing (noise removing process), the jaggy portion reducing (antialiasing process), and the blurring portion reducing (sharpening process) can be performed at the same time, while this local collage processing is executed in such a manner that the range block image larger than the domain block image is extracted, and then, both the reducing processing and the converting processing in response to the similarity degree between this extracted range block image and the domain block image are performed so as to replace this processed range block image as the improved domain block image. As a result, the image quality of the entire image can be comprehensively improved. Also, since the single and same processing is performed as to each of the image quality deteriorated portions, the stepped portion does not occur, and further, lowering of the image quality when the classification of the block is erroneously recognized does not occur. In addition, since the image quality is improved as to the image capable of satisfying the local self-similarity of the image, in such a case that the image is enlarged after the image quality has been improved, there is such an effect that the enlarged image having the higher image quality can be obtained.

What is claimed is:

1. An image processing apparatus for performing an image quality improving processing of an image, comprising:
    a domain block extracting section for extracting a domain block image from an original image in the unit of a first block unit;
    a range block extracting section for extracting a range block image from the original image in the unit of a second block unit which is larger than the first block unit with respect to the domain block image;
    a reduced range block forming section for reducing the extracted range block image to the size of the first block unit;
    an improved domain block forming section for performing a pixel value conversion with respect to the reduced range block image formed by the reduced range block forming section, and for outputting the pixel-value-converted reduced range block image as an improved domain block image;
    a similarity degree judging section for judging a similarity degree between the domain block image and the reduced range block image by the reduced range block forming section, the improved domain block forming section performs the pixel value conversion based upon the similarity degree obtained by the similarity degree judging section; and a domain block classifying section for classifying a sort of the domain block image extracted by the domain block extracting section, wherein the domain block image other than the domain block image which has been classified to a previously determined sort is directly outputted as the improved domain block image, the domain block classifying section classifies the domain block image to a flat portion, a step edge portion, a noise portion, and a texture portion based upon both standard deviation and a concave/convex degree of the domain block image, and the each of the above sections is implemented in hardware or hardware/software combination.

2. The image processing apparatus according to claim 1, wherein the range block extracting section extracts a range block image from the original image in the second block unit larger than the first block unit with respect to the domain block image which has been classified to the step edge portion by the domain block classifying section.

3. The image processing apparatus according to claim 1, wherein the range block extracting section extracts a range block image from the original image in the second block unit larger than the first block unit with respect to the domain block image which has been classified to the noise portion by the domain block classifying section.

4. The image processing apparatus according to claim 1, wherein the range block extracting section extracts a range block image from the original image in the second block unit larger than the first block unit with respect to the domain block image which has been classified to the step edge portion, or the noise portion by the domain block classifying section.

5. The image processing apparatus according to claim 1, further comprising an edge emphasizing section for executing an edge enhancement processing with respect to the improved domain block image based upon both a relationship between a maximum value and a minimum value of the pixel values within the improved domain block images, and an edge degree of the improved domain block image, wherein the edge emphasizing section executes the edge enhancement processing only for the improved domain block image which corresponds to the domain block image classified to the step edge portion by the domain block classifying section.

6. An image processing apparatus for performing an image quality improving processing of an image, comprising:

a domain block extracting section for extracting a domain block image from an original image in the unit of a first block unit;

a range block extracting section for extracting a range block image from the original image in the unit of a second block unit which is larger than the first block unit with respect to the domain block image;

a reduced range block forming section for reducing the extracted range block image to the size of the first block unit;

an improved domain block forming section for performing a pixel value conversion with respect to the reduced range block image formed by the reduced range block forming section, and for outputting the pixel-value-converted reduced range block image as an improved domain block image;

a similarity degree judging section for judging a similarity degree between the domain block image and the reduced range block image by the reduced range block forming section, the improved domain block forming section performs the pixel value conversion based upon the similarity degree obtained by the similarity degree judging section; and an edge emphasizing section for executing an edge enhancement processing with respect to the improved domain block image based upon both a relationship between a maximum value and a minimum value of the pixel values within the improved domain block images, and an edge degree of the improved domain block image, wherein each of the above sections is implemented in hardware or hardware/software combination.

7. The image processing apparatus according to claim 6, wherein the edge emphasizing section calculates an averaged pixel value as to both the maximum pixel value and the minimum pixel value within the improved domain block image, converts a pixel value larger than the averaged pixel value into a larger pixel value in response to a distance between the own pixel value and the averaged pixel value, and also converts a pixel value smaller than the averaged pixel value into a smaller pixel value in response to a distance between the own pixel value and the averaged pixel value in accordance with a strength of an edge enhancement.

8. The image processing apparatus according to claim 7, wherein the strength of the edge enhancement employed in the edge emphasizing section is set in such a manner that when a standard deviation value of the pixel values contained in the domain block image is small, the strength is made strong, whereas when a standard deviation value of the pixel values is large, the strength is made weak.

9. An image processing method for performing an image quality improving processing of an image, comprising:

using a computer to perform the steps comprising:

extracting a domain block image from an original image in the unit of a first block unit;

extracting a range block image from the original image in the unit of a second block unit larger than the first block unit with respect to the domain block image;

reducing a size of the extracted range block image to the size of the first block unit;

judging a similarity degree between the reduced range block image and the domain block image;

forming an improved domain block image based upon a result obtained by converting pixel values as to the reduced range block image based upon the similarity degree;

classifying a sort of the domain block image extracted from the original image; and outputting the domain block image other than the domain block image which has been classified to a previously-determined sort as the improved domain block image, wherein the classifying of a sort of the domain block image classifies the domain block image to a fiat portion, a step edge portion, a noise portion, and a texture portion based upon both standard deviation and a concave/convex degree of the domain block image.

10. The image processing method according to claim 9, wherein the extracting of the range block image is performed when the domain block image is classified to a step edge portion.

11. The image processing method according to claim 9, wherein the extracting of the range block image is performed when the domain block image is classified to a noise portion.

12. The image processing method according to claim 9, wherein the extracting of the range block image is performed when the domain block image is classified to one of a step edge portion and a noise portion.

13. The image processing method according to claim 9, wherein when the sort of the domain block image is classified to the step edge portion, an edge enhancement processing is performed with respect to the improved domain block image based upon both a relationship between a maximum value and a minimum value of the pixel values within the improved domain block images, and an edge degree of the improved domain block image only for the improved domain block image which corresponds to the domain block image.

14. An image processing method for performing an image quality improving processing of an image, comprising:
  using a computer to perform the steps comprising:
  extracting a domain block image from an original image in the unit of a first block unit;
  extracting a range block image from the original image in the unit of a second block unit larger than the first block unit with respect to the domain block image;
  reducing a size of the extracted range block image to the size of the first block unit;
  judging a similarity degree between the reduced range block image and the domain block image;
  forming an improved domain block image based upon a result obtained by converting pixel values as to the reduced range block image based upon the similarity degree; and
  performing an edge enhancement processing with respect to the improved domain block image based upon both a relationship between a maximum value and a minimum value of the pixel values within the improved domain block images, and an edge degree of the improved domain block image.

15. The image processing method according to claim 14, wherein the edge enhancement processing calculates an averaged pixel value as to both the maximum pixel value and the minimum pixel value within the improved domain block image, converts a pixel value larger than the averaged pixel value into a larger pixel value in response to a distance between the own pixel value and the averaged pixel value, and also converts a pixel value smaller than the averaged pixel value into a smaller pixel value in response to a distance between the own pixel value and the averaged pixel value in accordance with a strength of an edge enhancement.

16. The image processing method according to claim 15, wherein the strength of the edge enhancement employed in the edge enhancement processing is set in such a mariner that when a standard deviation value of the pixel values contained in the domain block image is small, the strength is made strong, whereas when a standard deviation value of the pixel values is large, the strength is made weak.

* * * * *